(12) United States Patent
Fasel et al.

(10) Patent No.: US 11,981,421 B2
(45) Date of Patent: May 14, 2024

(54) FLOW CONTROL TECHNIQUES FOR DELAYING OR ACCELERATING LAMINAR-TURBULENT BOUNDARY-LAYER TRANSITION FOR HIGH-SPEED FLIGHT VEHICLES

(71) Applicant: ARIZONA BOARD OF REGENTS ON BEHALF OF THE UNIVERSITY OF ARIZONA, Tucson, AZ (US)

(72) Inventors: Hermann F. Fasel, Tucson, AZ (US); Christoph Hader, Tucson, AZ (US)

(73) Assignee: Arizona Board of Regents on behalf of the University of Arizona, Tucson, AZ (US)

( * ) Notice: Subject to any disclaimer, the term of this patent is extended or adjusted under 35 U.S.C. 154(b) by 197 days.

(21) Appl. No.: 17/134,047

(22) Filed: Dec. 24, 2020

(65) Prior Publication Data

US 2021/0316844 A1   Oct. 14, 2021

Related U.S. Application Data

(60) Provisional application No. 62/953,367, filed on Dec. 24, 2019.

(51) Int. Cl.
| | | |
|---|---|---|
| B64C 21/04 | (2023.01) | |
| B64C 21/06 | (2023.01) | |
| B64C 23/00 | (2006.01) | |
| B64C 30/00 | (2006.01) | |

(52) U.S. Cl.
CPC ............ *B64C 23/005* (2013.01); *B64C 21/04* (2013.01); *B64C 21/06* (2013.01); *B64C 30/00* (2013.01)

(58) Field of Classification Search
CPC ....... B64C 21/025; B64C 21/04; B64C 21/06; B64C 30/00; B64C 21/10; B64C 23/005
See application file for complete search history.

(56) References Cited

U.S. PATENT DOCUMENTS

| 5,348,256 A | * | 9/1994 | Parikh | ..................... B64C 21/06 |
|---|---|---|---|---|
| | | | | D12/333 |
| 2009/0212165 A1 | * | 8/2009 | Parikh | ..................... B64C 21/06 |
| | | | | 244/209 |
| 2014/0217241 A1 | * | 8/2014 | Exton | ..................... B64C 23/00 |
| | | | | 244/200 |

(Continued)

*Primary Examiner* — Nicholas McFall
*Assistant Examiner* — Terri L Filosi
(74) *Attorney, Agent, or Firm* — Blank Rome LLP

(57) ABSTRACT

A system and method for controlling boundary layer transition for a high-speed vehicle are disclosed. The method includes determining a location of onset of boundary-layer transition that naturally develops during high-speed flight of the high-speed vehicle, and providing a pair of flow control strips at a surface/wall/skin of the high-speed vehicle such that the boundary-layer transition is delayed or prevented during high-speed flight of the high-speed vehicle. The delayed or prevented locations of the transition result in a change in the high-speed boundary layer during the high-speed flight of the high-speed vehicle. The change in the high-speed boundary layer transition affects skin friction drag, aero-thermodynamic heating, and pressure fluctuations in the boundary layer of the high-speed vehicle.

16 Claims, 21 Drawing Sheets

(56) References Cited

U.S. PATENT DOCUMENTS

2015/0336659 A1* 11/2015 Zhong ...................... F15D 1/08
    244/130
2017/0240271 A1* 8/2017 Fasel ...................... B64C 21/08
2018/0105258 A1* 4/2018 Paredes Gonzalez .. B64C 30/00

* cited by examiner

FLOW CONTROL TECHNIQUES FOR DELAYING OR ACCELERATING LAMINAR-TURBULENT BOUNDARY-LAYER TRANSITION FOR HIGH-SPEED FLIGHT VEHICLES

CROSS REFERENCE TO RELATED APPLICATION

This application claims priority to U.S. provisional patent application No. 62/953,367, filed on Dec. 24, 2019, which is hereby incorporated herein by reference in its entirety.

GOVERNMENT SPONSORSHIP

This invention was made with government support under Grant No. FA9550-15-1-0265 awarded by the Air Force Office of Scientific Research. The government has certain rights in the invention.

FIELD OF THE INVENTION

Embodiments are in the field of high-speed boundary layer transition. More particularly, embodiments disclosed herein relate to systems and methods for controlling high-speed boundary layer transition via various flow control techniques which, inter alia, foster enhanced aerodynamic performance, reduced aero-thermodynamic heating, and improved vehicle guidance and control characteristics of high-speed flight vehicles.

BACKGROUND OF THE INVENTION

Laminar-turbulent transition in hypersonic boundary layers is a major unresolved topic in Fluid Dynamics. Although significant progress has been made in recent years, crucial aspects of the transition physics are still in the dark. For the future High-Speed Civil Transport (HSCT), as well as for numerous defense-related applications such as high-speed missiles, high-speed reconnaissance aircraft, the Theater Missile Defense (TMD) interceptors, and the Hyper-X program, considerable progress toward the understanding of high-speed boundary layer transition is required in order to develop reliable transition prediction methods that can be used for the design and safe operation of such advanced flight vehicles. The crucial need for reliable transition prediction methods for high-speed applications is due to the fact that transition to turbulence in supersonic/hypersonic boundary layers is associated with considerable increases in heat transfer. The increased heat loads (caused by transition) on the structure of the flight vehicles represent the main difficulties in designing and operating high-speed vehicles. Appropriate measures to guard against the heat transfer due to aero-thermal loads are expensive and/or result in significant weight penalties. Good estimates of the transition location are of vital importance because only then can the aero-thermal loads and surface temperatures be adequately predicted. In addition to surface heating, transition to turbulence also has a significant effect on the aerodynamic performance of high-speed flight vehicles, as the skin friction for turbulent boundary layers is considerably higher than for the laminar boundary layer.

The understanding of transition for low-speed (incompressible) boundary layers is far ahead of that for high-speed (compressible) boundary layers, although many crucial aspects are also still not understood even for the low-speed case. There are several important reasons for the significant gap in understanding of high-speed transition relative to low-speed transition. Of course, historically, high-speed flight, in particular hypersonic flight, has not been considered until recently and therefore the need to understand and predict transition did not exist earlier. However, there are two other main reasons why it is more difficult to obtain knowledge for high-speed boundary layer transition than for the low-speed case: i) Quality experiments for high-speed transition are considerably more difficult to carry out than for incompressible transition and require high-speed testing facilities that are expensive to construct and expensive to operate. ii) The physics of high-speed boundary layer transition are much more complex than for low speeds.

From linear stability theory, it is known that multiple instability modes exist for high-speed boundary layer flows, in contrast to only one mode (Tollmien-Schlichting, TS) for the incompressible case. The so-called first mode in supersonic boundary layers is equivalent to the TS-mode in incompressible boundary layers. However, in contrast to incompressible boundary layers, where, according to Squire's theorem, two-dimensional waves are generally more amplified than three-dimensional waves, for supersonic boundary layers three-dimensional (oblique) waves are more amplified than two-dimensional ones. Thus, experiments and theory always have to address the more complex problem of three-dimensional wave propagation. In addition to the first mode, which is viscous, higher modes exist for supersonic boundary layers that result from an inviscid instability mechanism. According to Linear Stability Theory (LST), the most unstable higher modes are two-dimensional, unlike oblique first modes. Also, from LST, it is known that the first mode is dominant (higher amplification rates) for low supersonic Mach numbers while for Mach numbers above 4 the second mode is dominant (most amplified). In addition, for typical supersonic/hypersonic flight vehicle configurations, the three-dimensional nature of the boundary layers that develop, for example, on swept wings and/or lifting bodies, can give rise to so-called cross-flow instabilities and, as a consequence, cross-flow vortices that can be stationary or traveling. Due to the difficulties in carrying out experiments (and "controlled" experiments, in particular) and due to the existence of multiple instability modes, the role and importance of the various instability modes in a realistic transition process are not understood at all. Of course, when amplitudes of the various instability modes reach high enough levels, nonlinear interactions of these modes can occur. As a consequence, the transition process in high-speed boundary layers is highly non-unique (our simulations support this conjecture, see below), which means that slight changes in the environment or vehicle geometry may significantly alter the transition process.

An additional difficulty arises from the fact that for high-speed boundary layers the transition processes in free flight may be very different from those in the laboratory. The difference between conditions for free flight ("hot," atmospheric conditions) and the laboratory ("cold" conditions) has a considerable effect on the stability behavior and, as a consequence, on the transition processes. This is best summarized by the following quote from a pioneer in experimental high-speed transition research: " . . . one should not expect a transition Reynolds number obtained in any wind tunnel, conventional or quiet, to be directly relatable to flight." Furthermore, there are still crucial unresolved issues in the understanding of hypersonic transition (e.g. roughness, nose radius, approach flow conditions, etc.) that hamper the progress needed for the development of hypersonic flight vehicles. These topics are investigated below.

These facts clearly indicate already the critical need of investigating high-speed boundary-layer transition. The numerical simulation codes can be tested and validated by detailed comparison with laboratory experiments. Thereafter, they can be applied with more confidence to predict the effects of various conditions on the transition processes and the resulting aerodynamic and aero-thermodynamic behavior. Thus, simulations can provide the crucial understanding and information necessary for design and safe operation of high-speed vehicles.

Thus, it is desirable to provide a system and method for controlling hypersonic boundary layer transition for a hypersonic flight vehicle that are able to overcome the above disadvantages.

Advantages of the present invention will become more fully apparent from the detailed description of the invention hereinbelow.

SUMMARY OF THE INVENTION

Embodiments are directed to novel flow control techniques for modifying the "natural" (uncontrolled) laminar to turbulent transition process of the flow in the boundary layer of vehicles, projectiles or missiles ("vehicles") at supersonic/hypersonic speeds ("high-speed"). The boundary layer is a very thin layer of fluid that develops near the skin of vehicles, projectiles or missiles at any flow speed. The fluidic state of the boundary layer, laminar, transitional or turbulent, determines the degree of skin friction and heating of high-speed vehicles. The drag caused by skin friction contributes a large portion to the total drag of a high-speed vehicle. Higher drag reduces the range and/or maximum payload of the vehicle. High wall-heating requires special materials that are very expensive and/or require Thermal Protection Systems (TPS) that add to the weight of the vehicle so that the maximum payload and/or the range of the vehicle is reduced. Therefore, to minimize these negative effects it is beneficial to delay the onset of transition and the subsequent breakdown to turbulence as far downstream on the vehicle as possible. As the transition process in high-speed boundary layers is associated with strong unsteadiness, large pressure fluctuations, and intermittency, it may also be beneficial to accelerate the transition in order to quickly establish a fully turbulent state, as for example in the vicinity of sensors, cameras, and for the flow over control surfaces of the high-speed vehicle.

The present disclosure provides conclusive evidence that compressibility effects can cause a considerable stretching of both the linear and nonlinear transition regime in the downstream direction compared to incompressible boundary layers. The practically relevant implication of this finding is that transitional flow fields can cover very large downstream extents of actual high-speed flight vehicles. In addition, for hypersonic flows, the nonlinear interactions in the transition regime can lead to the development of streamwise streaks of locally very high skin friction and heat loads ("hot streaks") that far exceed the turbulent values. This may negatively affect the aerodynamic performance and may compromise the structural integrity of flight vehicles. In addition, the large pressure fluctuations, which can occur in the nonlinear transition regime, may overwhelm the guidance and control system of high-speed vehicles.

The "Imbedded Compact Control Actuators" (ICCAs) will delay or prevent entirely the negative effects caused by the boundary-layer transition, including also the particularly detrimental effects in the nonlinear transition regime, namely, the unsteadiness of the flow caused by the large fluctuation amplitudes, the development of higher than turbulent values for skin friction and heat loads ("overshoots"), and the highly detrimental hot streak development. The ICCAs can also be optimized to accelerate transition in parts of the vehicle where transition delay is no longer feasible or desirable, but where the strong unsteadiness, large pressure fluctuations and intermittency associated with the nonlinear transition region cannot be tolerated as for example in the vicinity of sensors, cameras, and for the flow over control surfaces of the high-speed vehicle.

Additional embodiments and additional features of embodiments for the system and method for controlling boundary-layer transition for a high-speed vehicle are described below and are hereby incorporated into this section.

BRIEF DESCRIPTION OF THE DRAWINGS

The foregoing summary, as well as the following detailed description, will be better understood when read in conjunction with the appended drawings. For the purpose of illustration only, there is shown in the drawings certain embodiments. It is understood, however, that the inventive concepts disclosed herein are not limited to the precise arrangements and instrumentalities shown in the figures. The detailed description will refer to the following drawings in which like numerals, where present, refer to like items.

The figures illustrate various concepts relating to flow control techniques for delaying or accelerating laminar-turbulent boundary-layer transition for high-speed flight vehicles.

FIG. 16D is a plot illustrating a direct comparison of the time signals at two different downstream locations of the reference case with the two cases where flow control is applied.

FIG. 20D is a plot illustrating a comparison of the primary and secondary disturbance waves and the streamwise steady mode responsible for the "primary" streak development for the reference case and the two cases using flow control.

FIG. 24D is a plot illustrating a comparison of the auto-correlation factor development in downstream direction for a time lag of one primary wave period between the reference case and the two flow control cases.

DETAILED DESCRIPTION OF THE INVENTION

Figure 1:
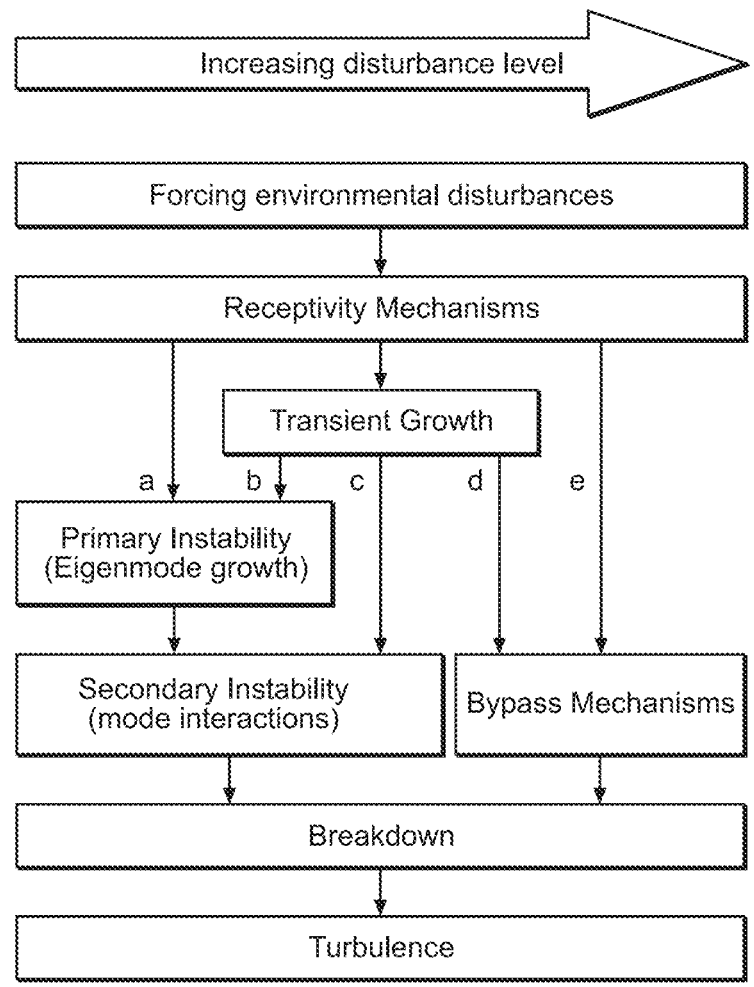
FIG. 1 is a drawing illustrating paths to transition.

It is to be understood that the figures and descriptions of the present invention may have been simplified to illustrate elements that are relevant for a clear understanding of the present invention, while eliminating, for purposes of clarity, other elements found in a typical high-speed vehicle or typical method of using/operating a high-speed vehicle. Those of ordinary skill in the art will recognize that other elements may be desirable and/or required in order to implement the present invention. However, because such elements are well known in the art, and because they do not facilitate a better understanding of the present invention, a discussion of such elements is not provided herein. It is also to be understood that the drawings included herewith only provide diagrammatic representations of the presently preferred structures of the present invention and that structures falling within the scope of the present invention may include structures different than those shown in the drawings. Reference will now be made to the drawings wherein like structures are provided with like reference designations.

Before explaining at least one embodiment in detail, it should be understood that the inventive concepts set forth herein are not limited in their application to the construction details or component arrangements set forth in the following description or illustrated in the drawings. It should also be understood that the phraseology and terminology employed herein are merely for descriptive purposes and should not be considered limiting.

It should further be understood that any one of the described features may be used separately or in combination with other features. Other invented devices, systems, methods, features, and advantages will be or become apparent to one with skill in the art upon examining the drawings and the detailed description herein. It is intended that all such additional devices, systems, methods, features, and advantages be protected by the accompanying claims.

For purposes of this disclosure, the term "high-speed" refers to velocities above Mach 1. It is noted that although the description below describes aspects of the disclosure with respect to Mach 6, for example, these aspects are also applicable to other high-speed velocities above Mach 1.

Figure 2:
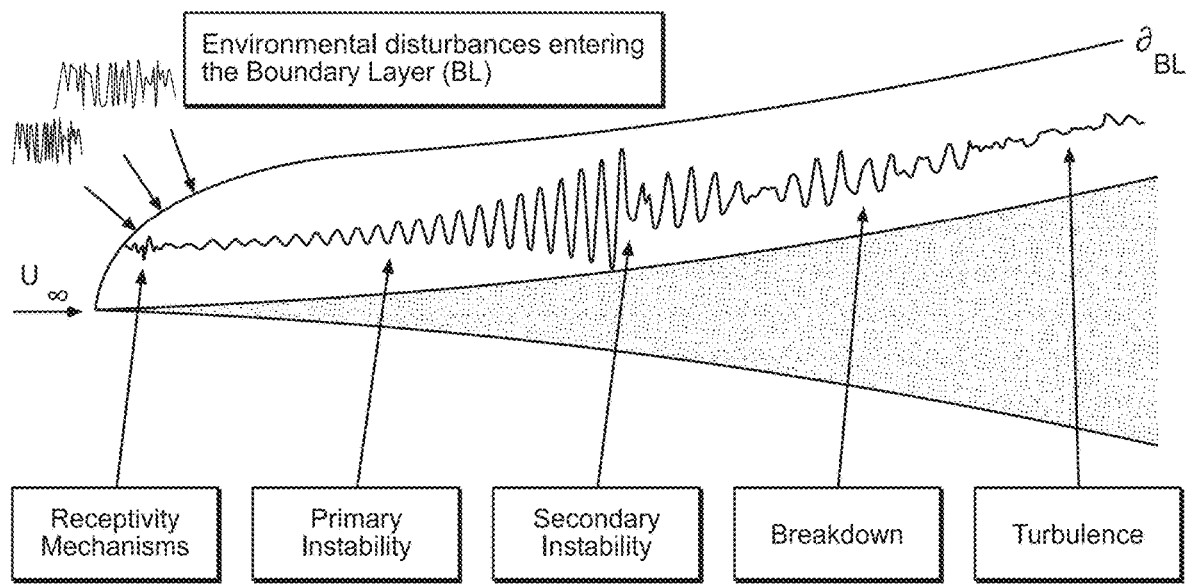
FIG. 2 is a schematic drawing of the different regions of path "a" from FIG. 1 (drawing not to scale).

The transition process has a profound impact on the skin-friction distribution and heat loads that high-speed vehicles experience during flight. A thorough understanding of the underlying mechanisms that ultimately lead to the breakdown to turbulence is necessary in order to safely design and operate these vehicles and to explore potential flow control mechanisms. This understanding is also required for designing flow control strategies for modifying the Laminar-turbulent transition process. Active or passive flow control strategies can be employed to either delay or accelerate transition, depending on the application. From the well-known and widely accepted road map of the various paths to transition (see FIG. 1), it becomes clear that control strategies can be targeted to manipulate different stages of the breakdown process. The route that the transition occurs on depends largely on the free-stream disturbance level. For quiet tunnel conditions with a low level of free-stream turbulence, the stages of the transition process from receptivity all the way to turbulence (path "a" in FIG. 1) are schematically shown in FIG. 2. For a breakdown in quiet tunnel conditions this means that manipulation or modification of the receptivity, the primary instability, the secondary instability or the breakdown stage could have the potential to control or delay transition. Since these stages continuously blend into one another and have no clear distinct boundaries, the control strategies focus on either manipulating linear or nonlinear processes that are known to be relevant for transition. The receptivity and primary instability regime are dominated by linear mechanisms, whereas all the subsequent stages are nonlinear.

Past research efforts have eluded to a degree on how different linear mechanisms are affected by vehicle design (passive control) or other active flow control (external energy input to the flow) strategies.

The influence of nose bluntness on the receptivity was numerically investigated for a 5-degree half angle straight cone at Mach 6. The study showed that the receptivity coefficients in large bluntness cases are much smaller compared to the sharp nose case. The transition onset Reynolds number increased with increasing nose radius (bluntness). There is, however, a limit up to which bluntness is beneficial before blunting transition reversal sets in.

Numerical investigations of the influence of an isolated roughness element on the linear stability behavior of a second mode in a Mach 5.92 flat plate boundary layer suggested that roughness elements that are approximately half a boundary layer thickness high, can affect the propagation of the instability waves. In a continuing study, the feasibility of the stabilization of a Mach 5.92 flat plate boundary layer was explored by using two-dimensional roughness elements. The study indicated that a second mode disturbance wave is destabilized when the roughness element is located upstream of the so-called synchronization point but stabilized when it is located downstream of the synchronization point. The numerical investigations on the effect of two-dimensional roughness elements for a wide range of frequencies, instead of a single frequency only, confirmed that two-dimensional roughness elements can amplify disturbance waves when they are located upstream of the synchronization point but can have a stabilizing effect when placed downstream of the synchronization point. The idea of carefully placed two-dimensional roughness elements was shown to work to damp linear second mode disturbance waves. Other techniques for controlling (delaying) transition is the use of ultrasonic coating.

Figure 3A:
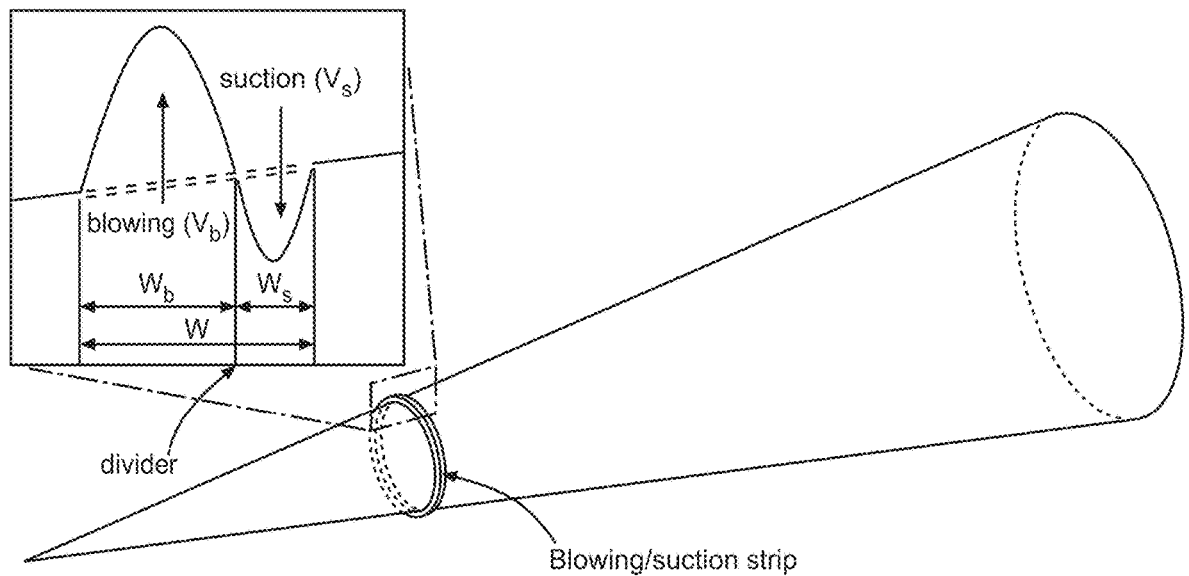
FIG. 3A is a schematic drawing of a single wall blowing and suction ICCA on the surface of the cone.
Figure 3B:
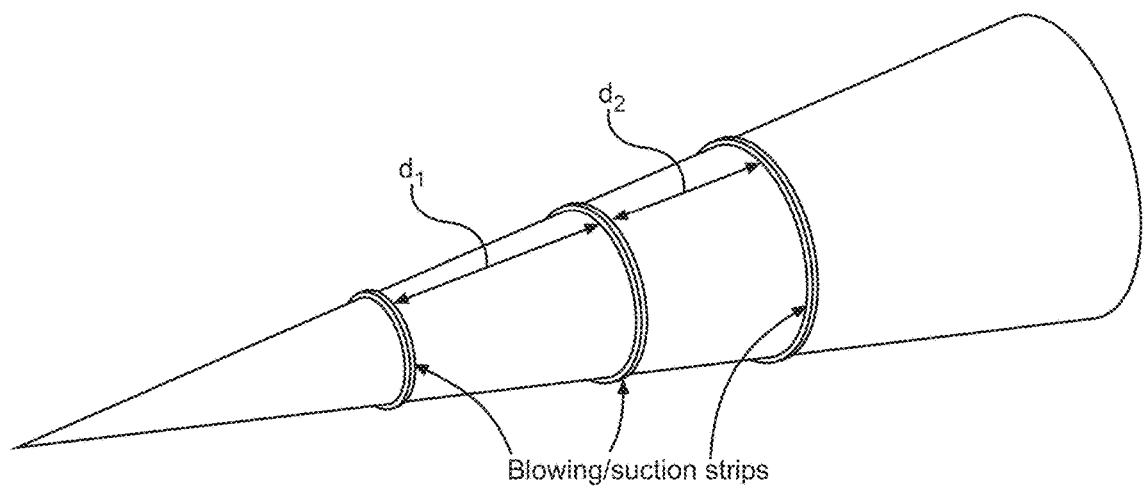
FIG. 3B is a schematic drawing of multiple ICCAs on the surface of the cone.

The focus of the strategies for flow control of the present disclosure is on controlling (delaying or preventing) transition, including also the nonlinear regime (with all the additional detrimental effects occurring in the nonlinear regime). Thus, the methods are not restricted for controlling of the linear regime as in the strategies discussed above. Specifically, the present disclosure employs localized two-dimensional (or spanwise oriented) so-called "Imbedded Compact Control Actuators" (ICCAs) that impart counter effects on the flow field immediately adjacent to the surface of the vehicle. An example is an ICCA that is composed of local (wall-normal) blowing that is immediately followed by suction, as illustrated in FIGS. 3A and 3B. The position of ICCA on the high-speed vehicle can be optimized for a given vehicle geometry and flight conditions. A detailed schematic of a blowing/suction ICCA is given in the close-up of FIG. 3A. Note, that the slot as shown in the close-up does not require a physical cut (slot) into the vehicle surface (which could compromise the structural strength) but can be realized by drilling small holes that connect to a small plenum below the surface, or use of porous, permeable materials. The total width of the ICCA is w, and the widths of the blowing and the suction slots are $w_b$ and $w_s$, respectively. Note that the blowing and suction slot widths ($w_b$, $w_s$) and the blowing velocity ($v_b$) and a suction velocity ($v_s$) do not have to be equal. The limiting cases where either the width $w_b$ or $w_s$ (see FIG. 3A) of the strip approaches zero are also possible, which will result in either a suction or blowing slot. Also note that within the ICCA, blowing/suction can be reversed to suction/blowing. Thus w, the ratio $w_b/w_s$, the velocity ratio $v_b/v_s$, the order of blowing/suction versus suction/blowing, and the position of the ICCA on the vehicle, can be optimized for a given vehicle shape and for a given flight envelope, and if the control objective is delay or acceleration of transition. Note that these ICCAs can be made adaptive as $v_b$ and $v_s$ within the ICCA can be adjusted in flight for, for example, the changing atmospheric conditions during the flight envelope. This can be accomplished using so-called look-up tables or by using sensors, that determine the state of the boundary layer (laminar, turbulent or transitional), together with a closed loop feedback controller.

This flow control strategy is not limited to a single ICCA. Rather multiple ICCAs can be distributed on the surface of the geometry (see for example FIG. 3B), where the number of ICCAs used and distances between them can again be optimized based on the given vehicle shape and/or the anticipated flight envelope. The optimal distances ($d_1$, $d_2$, . . . ) between the different ICCA's depend on the vehicle shape and the flight trajectories. Estimates can be obtained using stability theory and CFD simulations, and wind-tunnel measurements. Note, the feedback control strategy could be applied for each of the ICCAs individually (sub-controllers) combined with an overall (global control loop) or using only one closed-loop controller for all ICCAs.

Figure 4A:
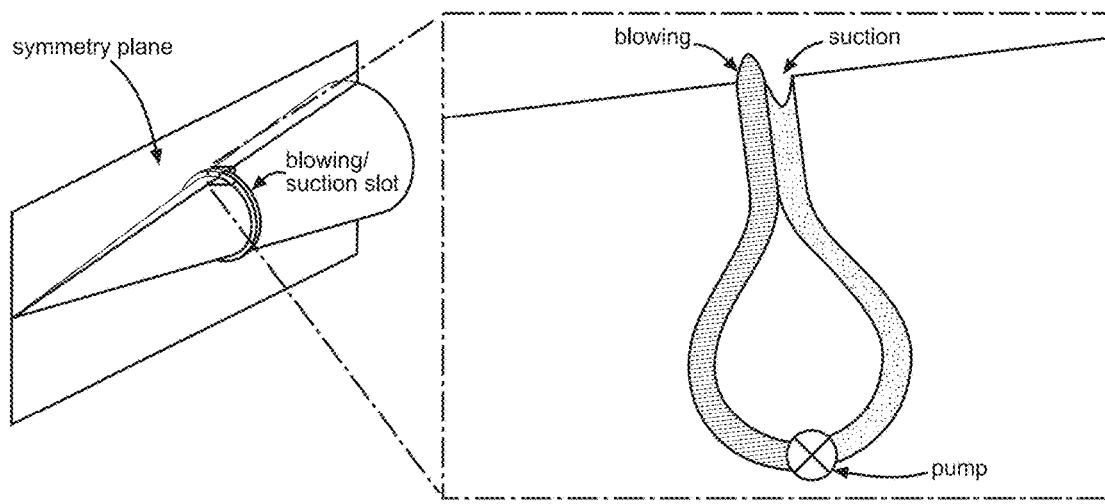
FIG. 4A is a schematic drawing of a possible implementation of blowing/suction ICCAs using a pump.
Figure 4B:
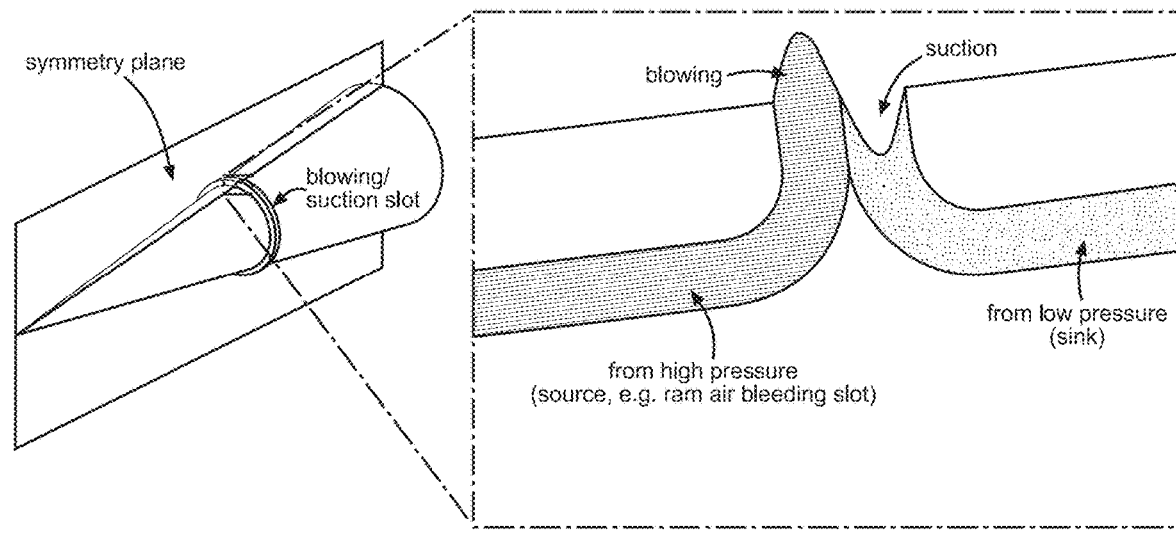
FIG. 4B is a schematic drawing of a possible implementation of blowing/suction ICCAs using high and low pressure from a vehicle.

Examples of possible blowing/suction implementations (but not limited to these examples) are given in FIGS. 4A and 4B. A pump inside the vehicle could produce a positive mass flux (blowing) as well as a suction as schematically depicted in FIG. 4A. Alternatively, one pump may be used for the blowing while another separate pump may be used for the suction. A further possibility would be to use air from a high-pressure part of the external flow around the vehicle and feed it into the blowing side of the ICCA, while the suction side would be connected to a low-pressure location (FIG. 4B).

Figure 5:
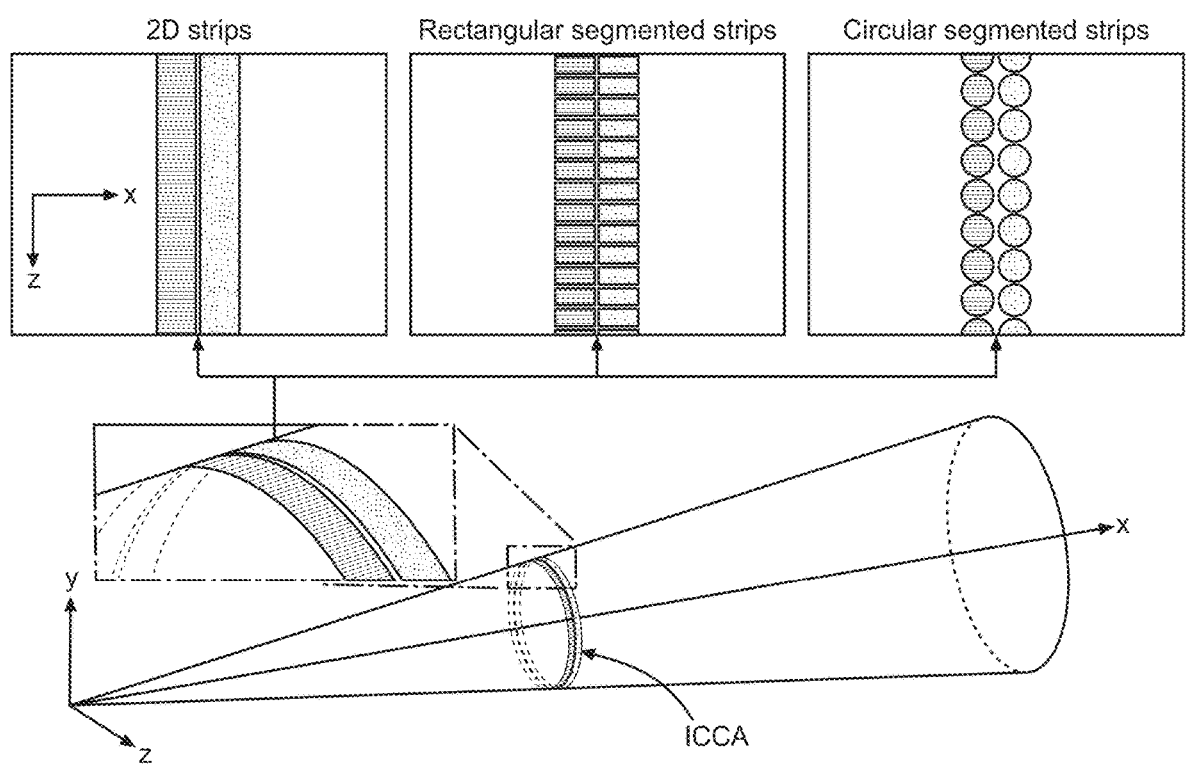
FIG. 5 is a drawing illustrating ICCA configurations.
Figure 6A:
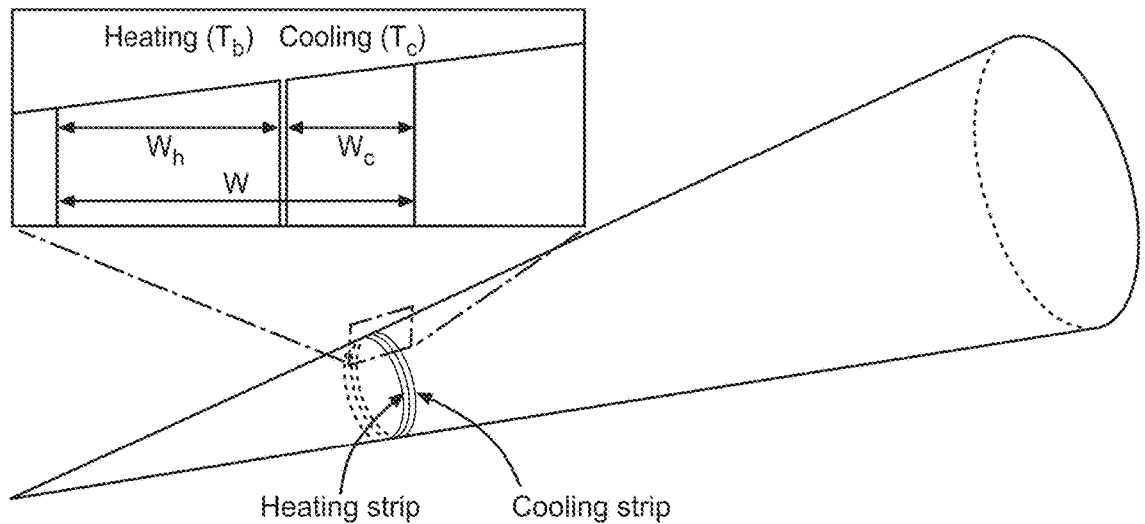
FIG. 6A is a schematic drawing of a heating/cooling ICCA with a close-up view.
Figure 6B:
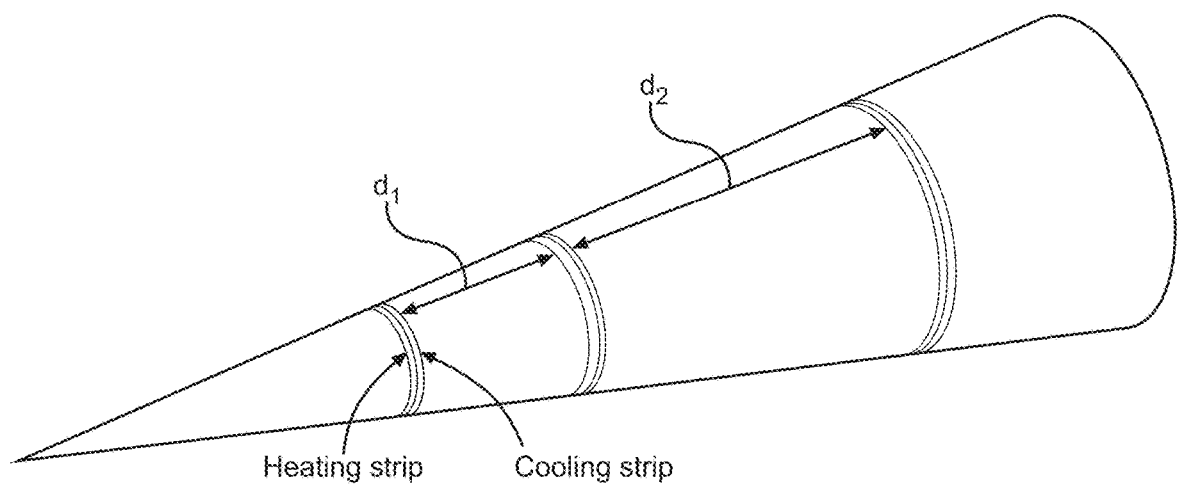
FIG. 6B is a schematic drawing of multiple heating/cooling ICCAs.
Figure 7A:
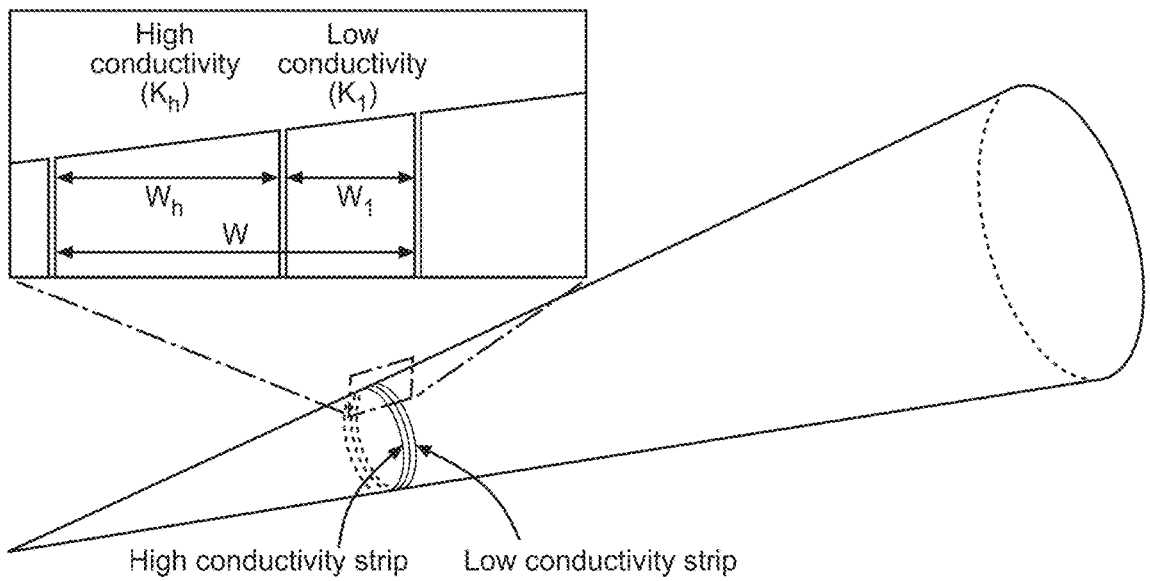
FIG. 7A is a schematic drawing of an ICCA comprising materials with different thermal conductivity.
Figure 7B:
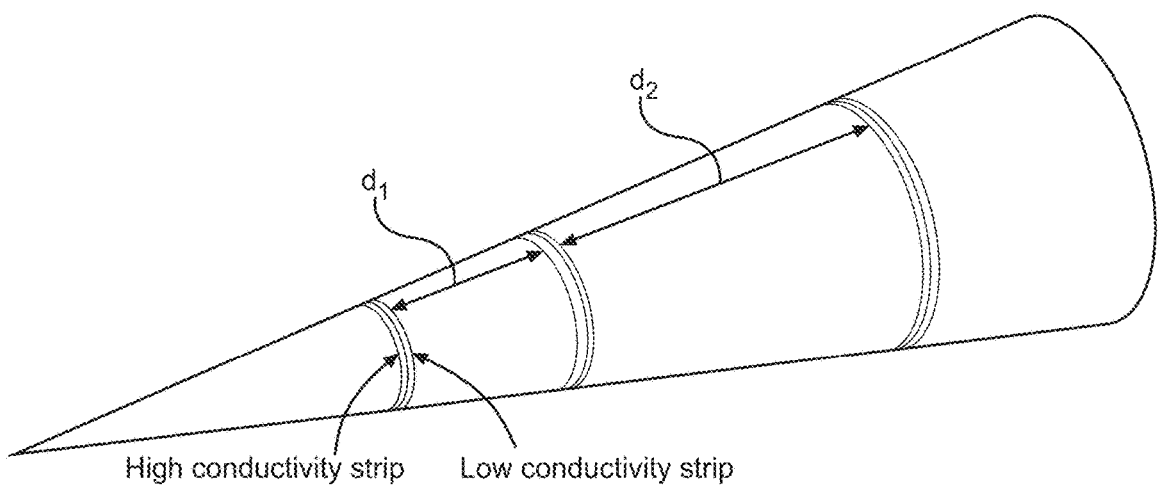
FIG. 7B is a schematic drawing of multiple conductivity-based ICCAs.

Various other realizations of ICCA implementations are possible, such as for example using high and low pressure sources from other parts of the vehicle. Schematics of examples how the ICCAs could be laid out on the vehicle surface are shown in FIG. 5. An ICCA could be implemented as 2D strips (FIG. 5, left) or, to maintain structural integrity when using blowing/suction ICCAs), the strips could be segmented as closely placed rectangular strips (FIG. 5, middle) or round holes (FIG. 5, right). Instead of a wall blowing and suction slot, the same or similar control effect could be achieved by a heating/cooling strip (FIGS. 6A and 6B), or by materials with different thermal conductivity (FIGS. 7A and 7B). The limiting cases where either the width $w_h$ or $w_c$ (see FIG. 6A) or $w_l$ or $w_h$ (FIG. 7A) of the strip approaches zero are also possible.

Note that different ICCAs, i.e. using different strategies within the ICCA as discussed above, namely using strips of, blowing/suction, hot/cold temperatures, different thermal conductivity, etc. could be employed simultaneously, thus providing an additional mean for optimization of the control objectives (transition delay or acceleration).

The individual strips, namely the upstream and downstream strip, of the ICCA could be selected from the group consisting of blowing devices, sucking devices, heating devices, cooling devices, high thermal conductivity devices, low thermal conductivity devices, and combinations thereof. For example, an upstream blowing strip may be combined with a downstream strip consisting of cooling or with different thermal conductivity than the surrounding material. Note also, the polarity of the upstream downstream strips within an ICCA can be reversed for all the devices mentioned above and the combinations thereof. For example, instead of using an upstream blowing strip and a downstream suction strip, an upstream suction strip and a downstream blowing strip can be used. Or, as for an example for combination strips, instead of an upstream heating strip and a downstream suction strip an upstream suction strip and a downstream heating strip could be employed.

A distinct physical separation is required between the upstream and the downstream strip so that the different effects of the upstream and downstream strip do not get mixed (see FIG. 3A) until they reach the surface of the vehicle. The width of these dividers between the upstream and downstream strip is dependent on the material used for the dividers and the skin of the vehicle so its structural integrity is not impaired.

Figure 8:
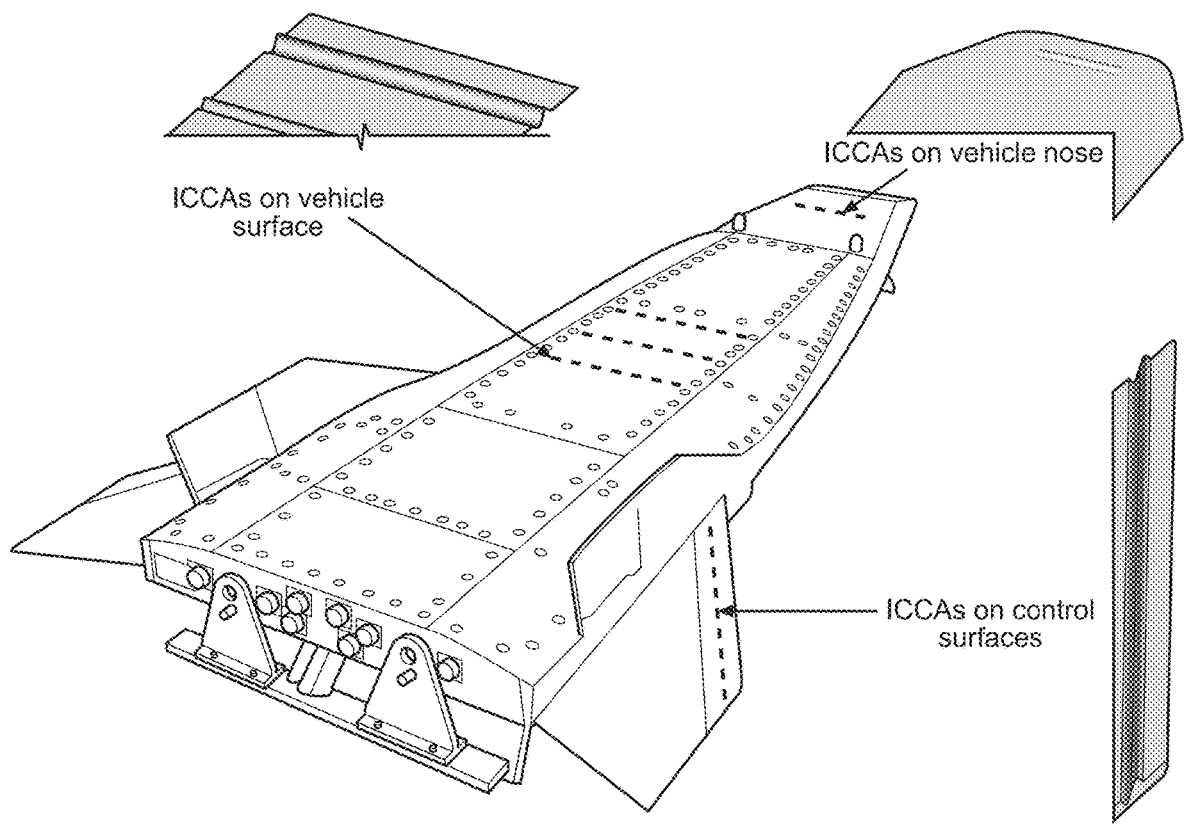
FIG. 8 is a schematic drawing of possible ICCA implementation on the X43 hypersonic wave rider.

A conceptual realization of ICCAs, for example for the NASA's X43 hypersonic wave rider, is provided in FIG. 8.

The present disclosure describes research findings for ICCAs using blowing and suction as an example; and it should be understood that the effects would be similar for ICCAs comprising of other modules/strategies as described above.

With detailed investigations of the fundamental breakdown on a flared cone at M=6, the present disclosure provided evidence that the "hot" streaks are caused by streamwise steady modes that are nonlinearly generated by the primary and secondary disturbance waves. This mode is generated when the secondary instability regime is reached.

This led to the idea to prevent or delay the streak generation and transition by hindering the steady streamwise modes from developing. It was conjectured that the three-dimensional modes can be prevented, or at the very least attenuated, by the use of forcing steady axisymmetric modes through wall blowing and suction strips. This disclosure explores the potential of such forcing strips to be used as a means of flow control.

Figure 9:
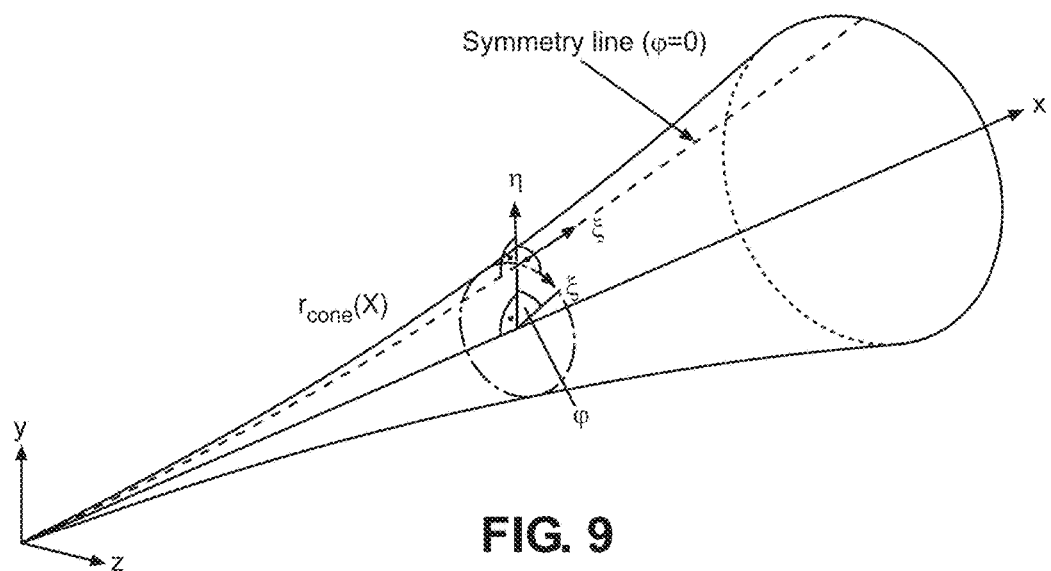
FIG. 9 is a schematic drawing of the flared cone geometry showing the different coordinate systems.

The geometry and flow conditions related to the present disclosure are now described. The transition investigations of the present disclosure are based on the Purdue flared cone geometry with a 4.5 inch base diameter that is used for the ongoing experiments. A schematic of the flared cone and the reference coordinate systems is provided in FIG. 9. The origin of the Cartesian coordinate system (x, y, z) is at the nose of the cone with the x axis along the symmetry axis of the cone. A body-fitted coordinate system ($\xi, \eta, \zeta$) is defined by the coordinate along the surface of the cone, the coordinate $\eta$ in the radial direction normal to the surface of the cone and the azimuthal (unrolled) coordinate $\zeta$. The azimuthal angle is denoted by $\varphi$ and the local cone radius measured perpendicular from the cone axis to the surface of the cone is given by $r_{cone}(x)$ The unrolled coordinate is calculated as $\zeta=\varphi r_{cone}(x)$. Details of the flared cone geometry and the flow conditions are summarized in Table 1.

TABLE 1

Flow conditions and details of the cone geometry for experiments.

| Geometry | | Flow Conditions | |
| --- | --- | --- | --- |
| Parameter | Value | Parameter | Value |
| Nose radius ($r_{nose}$) | $0.1016 \times 10^{-3}$ m | Mach number (M) | 6 |
| Initial half angle ($\theta$) | 1.4° | Stagnation pressure ($p_0$) | 140 psi |
| Cone flare ($r_{flare}$) | 3 m | Stagnation temperature ($T_0$) | 420 K |
| Cone length ($L_{cone}$) | 0.51 m | Unit Reynolds number ($Re_1$) | $10.82 \times 10^6$ 1/m |

Figure 10:
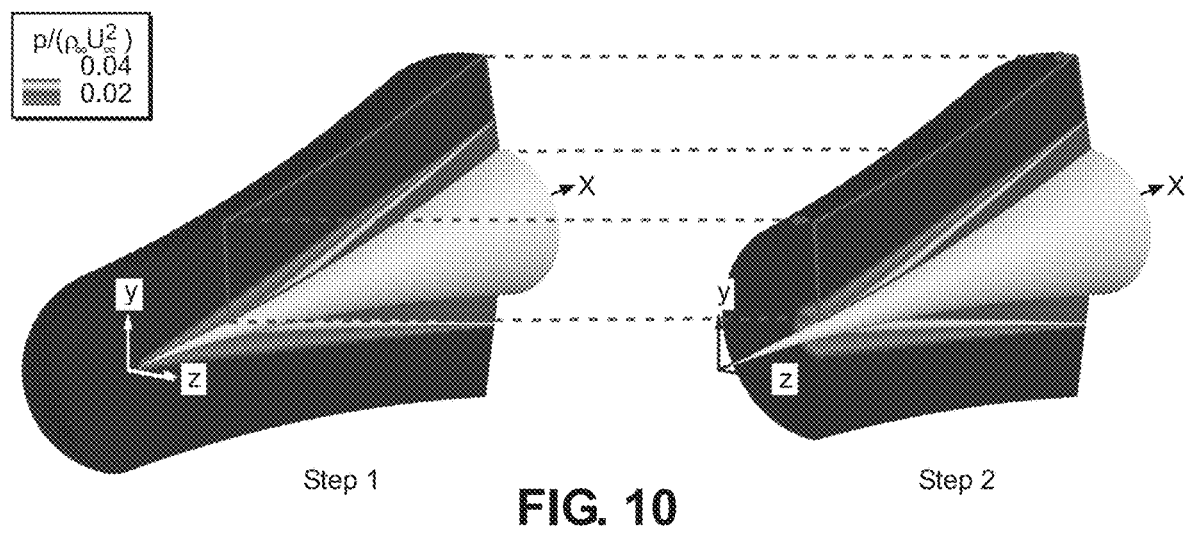
FIG. 10 is a schematic drawing of the computational domain used for step 1 (left side in figure) and steps 2 and 3 (right side of figure) of the employed three-step simulation strategy.

For this investigation a well-established and thoroughly tested three step simulation strategy was used. In a precursor calculation—step 1, the steady undisturbed basic flow field around the entire geometry is computed (FIG. 10) using a finite-volume (FV) code. Due to the low-order accuracy of the FV code and the large computational domain, it is not feasible to directly perform stability and transition simulations with a reasonable number of grid points and acceptable computer turn-around times. Therefore, in step 2, a new basic flow is calculated in a smaller subdomain (FIG. 10) using the solution of the precursor calculation for the boundary conditions at the inflow and free-stream boundary of the subdomain. The new basic flow is calculated using a high-order-accurate finite-difference code. Finally, in step 3, the actual transition simulations are carried out in the subdomain using the converged flow field from step 2 as basic flow. Thus, for the actual transition investigations all computational resources are focused only on the region of interest which results in enormous savings of computing resources. For step 3, the same high-order accurate code is employed as for step 2.

For brevity, only a short summary will be given of the details of the finite-difference (DNS) code used here. The numerical method is based on the three-dimensional Navier-Stokes equations, the continuity equation and the energy equation for a compressible fluid in generalized conical coordinates. The so-called spatial model is applied, where all three spatial dimensions and time are discretized without any modeling assumptions. High-order accurate non-compact central finite differences are used for discretization of the wall-normal (4th-order) and the streamwise direction (6th-order). In the azimuthal direction, a pseudo-spectral discretization using Fast Fourier Transforms is employed. The inviscid fluxes are separated into an upwind flux and a downwind flux using van Leer's splitting. Then, grid centered upwind biased differences with 9th-order accuracy are applied to evaluate the derivatives for these fluxes. Special attention is given to the wall-next boundary stencils. Since high-order accurate boundary closures are typically unstable, the order of the stencil is successively reduced from 9th-order to 3rd-order at the wall.

The wall is assumed to be isothermal for the base flow and will remain so even in the presence of the disturbances. Thus, the temperature disturbances at the wall vanish. The isothermal wall assumption with respect to the disturbances is justified because the wall temperature of the model remains nearly constant in the experiments due to the very short run times. At the outflow boundary a buffer is employed that effectively relaminarizes the flow. At the inflow and the free-stream boundary five grid points are used to enforce the laminar base flow values obtained from a precursor calculation using a lower-order finite volume code. Periodicity and symmetry conditions are imposed at the azimuthal boundaries allowing to reduce the simulation domain by a factor of two. These boundary conditions were selected because they have been successfully employed in previous high-resolved DNS to study laminar-turbulent transition.

The ICCA for this example comprising of an upstream blowing strip and a downstream suction strip was modeled in the DNS with a function of the form:

$$g(\tilde{x}) = \begin{cases} 1.5^4(1+\tilde{x})^3[3(1+\tilde{x})^2 - 7(1+\tilde{x}) + 4] & \text{for} -1 \leq \tilde{x} \leq 0 \\ -1.5^4(1-\tilde{x})^3[3(1-\tilde{x})^2 - 7(1-\tilde{x}) + 4] & \text{for } 0 \leq \tilde{x} \leq 1 \end{cases} \quad \text{Eq. 3.1}$$

where $\tilde{x}$ is a coordinate transformation as follows:

$$\tilde{x} = \frac{2x - (x_e - x_s)}{(x_e - x_s)}, \quad \text{Eq. 3.2}$$

with x being the streamwise coordinate along the cone axis (see FIG. 9) and the subscripts s and e denote the start and the end of the pair of forcing strips. The transfer function given in Equation (3.2) maps the start and the end of the forcing strips in the cartesian coordinate system to a normalized coordinate $\tilde{x}$, which is defined on the interval from $-1$ to 1. The complete forcing function to force the wall normal velocity disturbance at the wall is $$\frac{v'_{wall}(x)}{U_\infty} = A_0 g(\tilde{x}), \quad \text{Eq. 3.3}$$

where $A_0$ is the forcing amplitude. In the simulation, the location and size of the forcing strips can be controlled by adjusting the start and end coordinates $x_s$ and $x_e$.

Figure 11A:
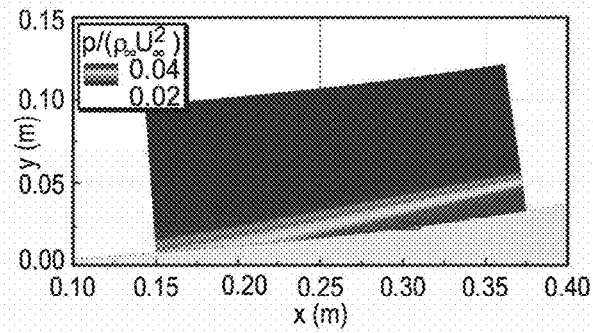
FIGS. 11A-11F are drawings illustrating pressure contours of the undisturbed base flow (FIG. 11A) and the corresponding close-up with streamlines (FIG. 11B), the pressure contours for the base flow with blowing and suction strips with a forcing amplitude of $A_0$=0.01 (FIG. 11C), and the corresponding close-up with streamlines (FIG. 11D), the pressure contours for the base flow with blowing and suction strips with an initial amplitude of $A_0=0.10$ (FIG. 11E), and the corresponding close-up with streamlines (FIG. 11F).
Figure 11B:
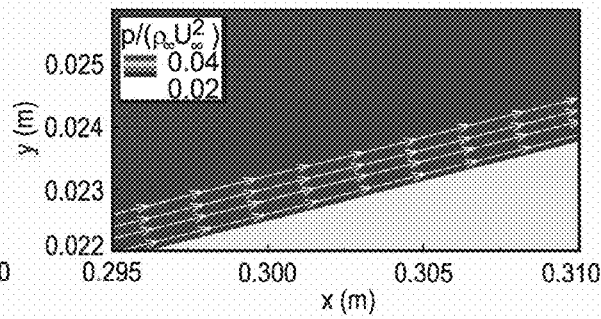
Figure 11C:
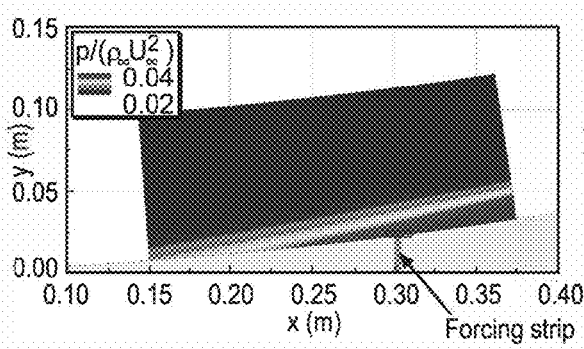
Figure 11D:
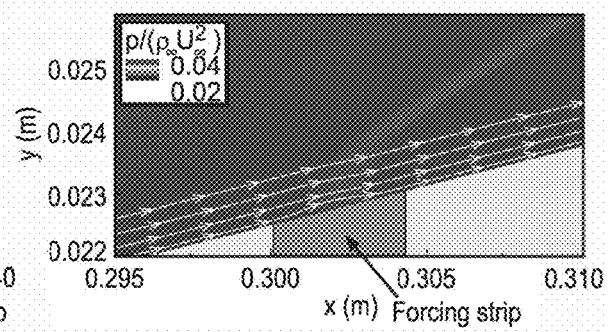
Figure 11E:
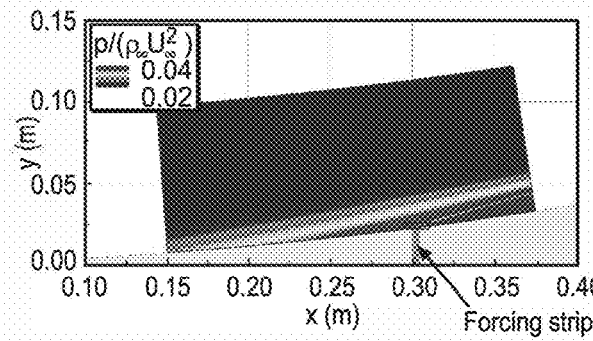
Figure 11F:
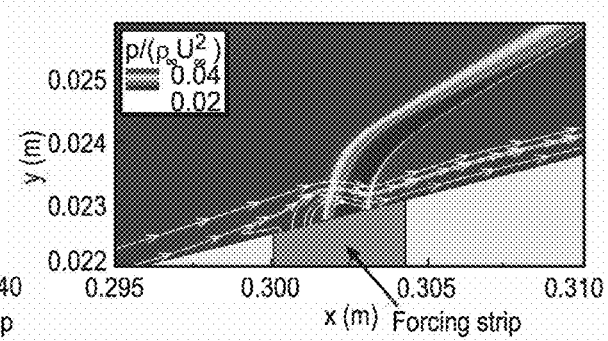

The base flow modifications resulting from the ICCA (here consisting of an upstream blowing strip and a downstream suction strip) for varying forcing amplitudes are presented in FIGS. 11A-11F. The pressure contours of the steady, undisturbed base flow are provided in FIG. 11A for reference. The pressure is continuously increasing along the downstream direction due to the cone flare. The close-up of the base flow contours with the streamlines, calculated from the streamwise and wall-normal velocity components (u, v), in FIG. 11B shows that the flow is parallel to the surface of the cone. With a blowing strip starting at $x_s$=0.30 m and the suction strip ending at $x_e$=0.304 m the base flow is altered. With a forcing amplitude of $A_0$ shown in FIG. 11C, the base flow modification is barely visible in the pressure contours, but the close-up in FIG. 11D shows a displacement of the streamlines close to the surface of the cone. Downstream of the end of the suction strip, the streamlines are parallel to the wall again indicating that the forcing strips only affect the base flow for a limited downstream extent. When increasing the forcing amplitude to $A_0$=0.10 (FIG. 11E) the pressure contours exhibit a weak shock resulting from the strong displacement due to the ICCA. The corresponding close-up with the streamlines in FIG. 11F shows a noticeable adjustment of the base flow in the vicinity of the blowing and suction strips.

The steady forcing through the blowing and suction strips is intended to modify and control the nonlinear stability regime in order to delay the streak development and/or transition. Note that the upstream and downstream strip of the ICCA could comprise of any of the devices (blowing, suction, heating, cooling, varying conductivity and material) and any combination thereof (as discussed above) to achieve this same effect. To investigate the influence of the position, width as well as the forcing amplitude of the ICCA (consisting in this example of an upstream blowing and a downstream suction strip) on the nonlinear processes, the effects on the secondary instability were evaluated first. Then, the ICCA was applied in a highly-resolved DNS.

Figure 12A:
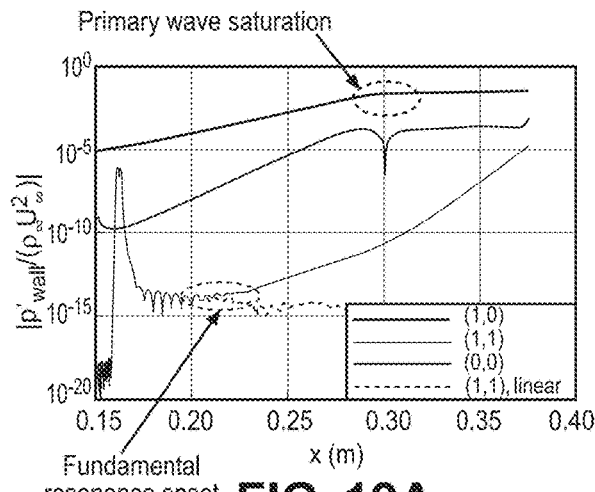
FIGS. 12A-12D are drawings illustrating development of the wall pressure disturbance amplitude in the downstream direction for a fundamental resonance scenario without blowing and suctions strips (reference case) (FIG. 12A), and cases with the ICCA located at $x_s=0.30$ m, a combined width of the blowing and suctions strips of w=0.004 m and a forcing amplitude of $A_0=0.01$ (FIG. 12B), $A_0=0.05$ (FIG. 12C), and $A_0=0.10$ (FIG. 12D).
Figure 12B:
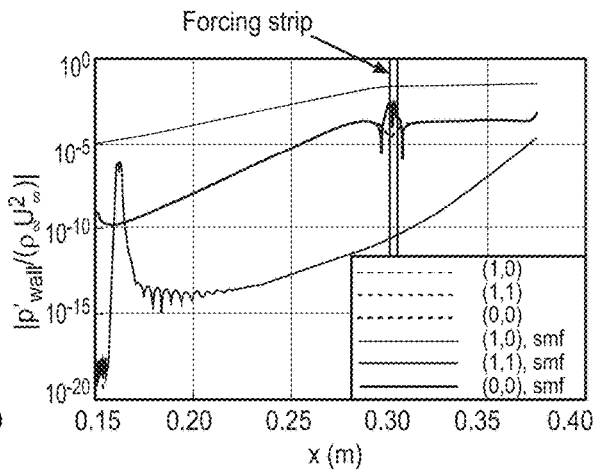
Figure 12C:
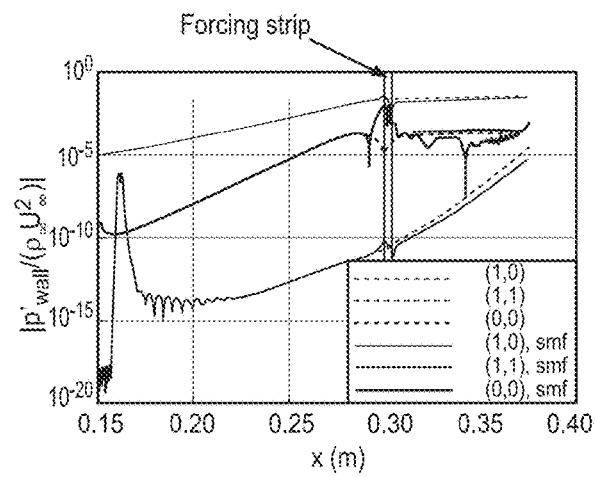

The influence of blowing and suction strips on the secondary instability is now described. The fundamental resonance scenario is the most dominant secondary instability mechanism and, therefore, the most likely route to transition for the flared cone geometry and the conditions investigated here (Table 1). Consequently, the effect of an ICCA consisting here of an upstream blowing and a downstream suction strip (see above) on the fundamental resonance onset was first evaluated. A fundamental resonance scenario is initiated with a large amplitude, 2D primary wave, mode (1,0), and a pair of low amplitude, 3D secondary oblique waves, mode (1, ±1). The results of the primary and secondary instability regime revealed that the strongest resonance occurred for a primary and secondary wave frequency of $f_{(1,0)}=f_{(1,1)}$=300 kHz and a secondary wave azimuthal wave number of $k_{c,(1,1)}$=80. This scenario was selected as the reference case to study the impact of the wall blowing and suction strips (ICCA) on the secondary instability and to assess the sensitivities to the different forcing parameters (see equation (3.3)) such as location ($x_s$) and width (w) of the ICCA and forcing amplitude ($A_0$). Note that in this investigation of the present disclosure, the width of the blowing strip ($w_b$) and the suction strip ($w_s$) were equal ($w_b/w_s$=1). The amplitude development in the downstream direction for the signature modes of the fundamental resonance for the reference case are provided in FIG. 12A. The primary disturbance wave, mode (1,0), grows exponentially according to linear theory until it begins to saturate (nonlinearly). When the primary wave reaches sufficiently large amplitudes, the secondary disturbance wave, mode (1,1), begins to depart from its linear behavior (behavior without the presence of a large amplitude primary wave) and experiences strong secondary growth.

Figure 12D:
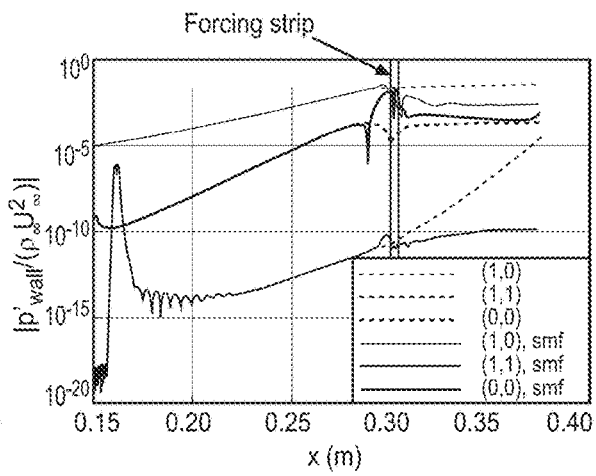

The effect of ICCA (blowing and suction strips) with different forcing amplitudes, $A_0$, on the fundamental resonance is presented in FIGS. 12-12D. To ensure that the secondary instability regime has been reached when the ICCA is applied, the blowing and suction strips were located downstream of the resonance onset location, where the primary wave has already saturated, and the secondary wave has begun to depart from its linear behavior. The results of the reference case (fundamental resonance without ICCA) in FIG. 12A indicate that the primary wave saturates around $x=0.30$ m and that at this location the resonance has been well established (secondary disturbance wave departs from linear behavior). Thus, the blowing and suction strips for these test cases were located at $x_s=0.30$ m, and $w=0.004$ m wide, which corresponds to approximately four times the laminar boundary layer thickness ($w \approx 4\delta_{99}$) of the undisturbed base flow. The forcing strip location is indicated by a grey shaded rectangle and the amplitude development in the downstream direction of the various disturbance modes of the reference case are provided for comparison as dashed lines in FIGS. 12B to 12D. For the smallest amplitude of $A_0=0.01$ (FIG. 12B), there is no discernible difference between the reference case and the resonance scenario with the ICCA, suggesting that this forcing amplitude is insufficient to alter the resonance onset. The results for an increased amplitude of $A_0=0.05$ in FIG. 12C show that the primary wave amplitude is slightly reduced downstream of the suction strip and that the growth rate of the secondary wave is marginally attenuated compared to the reference case. The insignificant differences, however, indicate that this forcing amplitude is also too small to considerably alter the secondary instability onset and the subsequent nonlinear stages of the transition process. Another increase to $A_0=0.10$ exhibits a significant change of the resonance process as shown in FIG. 12D. Not only is the nonlinear saturation amplitude of the primary wave noticeably reduced downstream of the wall blowing and suction strips, but the secondary disturbance wave is almost completely stabilized as indicated by the amplitude development in FIG. 12D. The results in FIG. 12 show that the wall blowing and suction strips have the potential to profoundly alter the fundamental resonance onset when the forcing amplitude is large enough. Based on this study, the forcing amplitude for all calculations discussed below was fixed at $A_0=0.10$ to explore the effect of position ($x_s$) and the combined width (w) of the control strips.

Figure 13A:
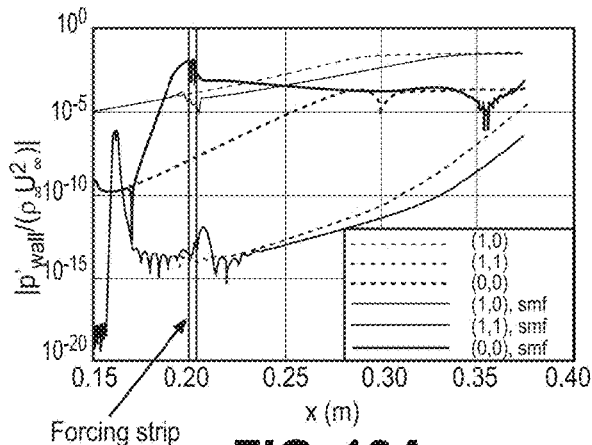
FIGS. 13A-13D are drawings illustrating development of the wall pressure disturbance amplitude in the downstream direction for a fundamental resonance scenario with and without flow control for an ICCA width of w=0.004 m, a forcing amplitude of $A_0=0.1$ and a strip location of $x_s=0.20$ m (FIG. 13A), $x_s=0.26$ m (FIG. 13B), $x_s=0.30$ m (FIG. 13C), and $x_s=0.34$ m (FIG. 13D).
Figure 13B:
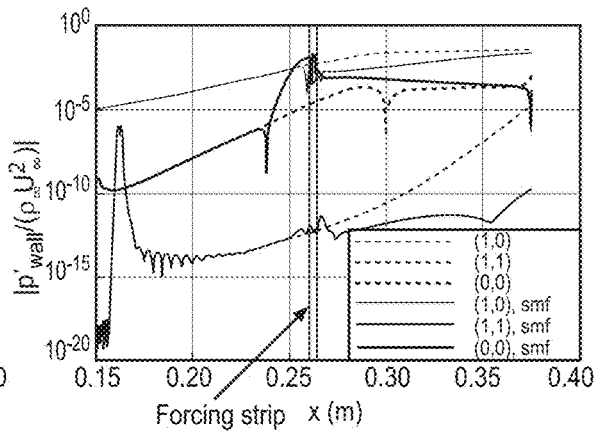
Figure 13C:
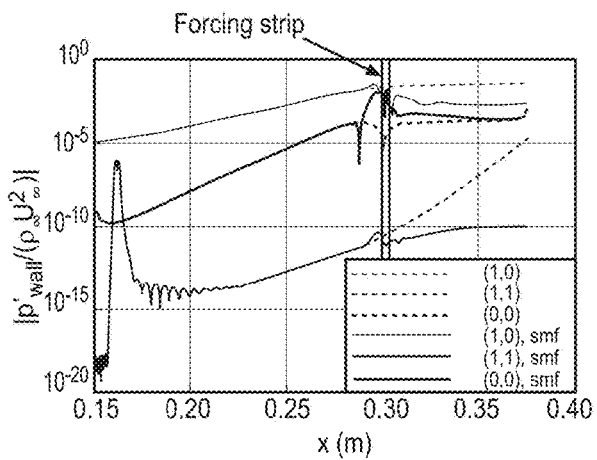
Figure 13D:
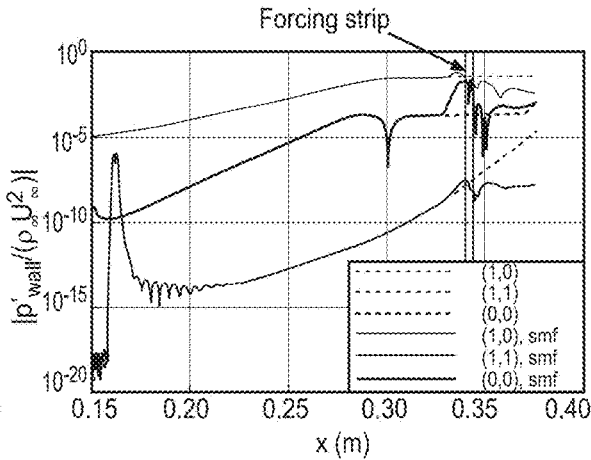
Figure 14A:
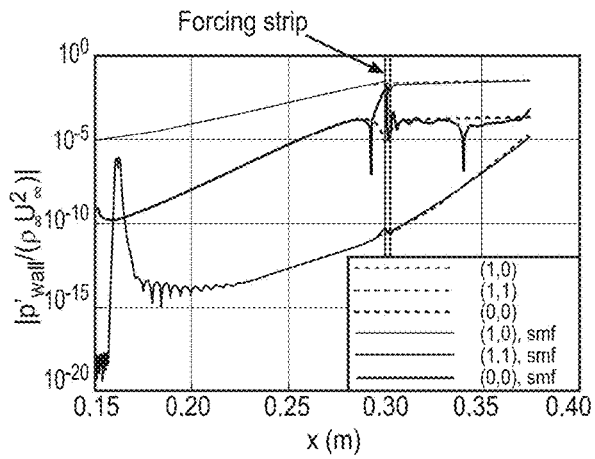
FIGS. 14A-14D are drawings illustrating development of the wall pressure disturbance amplitude in the downstream direction for a fundamental resonance scenario with and without flow control for an ICCA location of $x_s=0.30$ m, a forcing amplitude of $A_0=0.1$, and an ICCA width of w=0.002 m (FIG. 14A), w=0.004 m (FIG. 14B), w=0.008 m (FIG. 14C), and w=0.016 m (FIG. 14D).
Figure 14B:
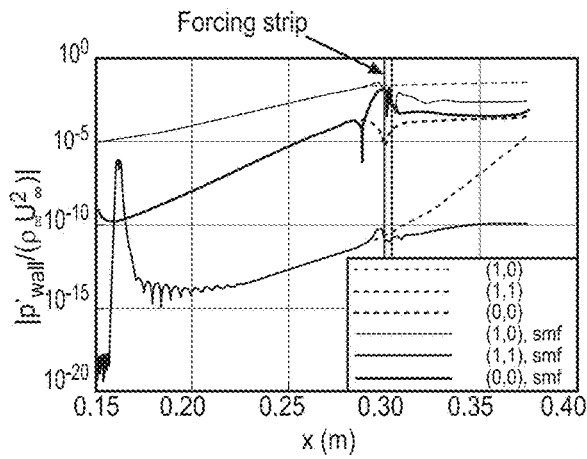
Figure 14C:
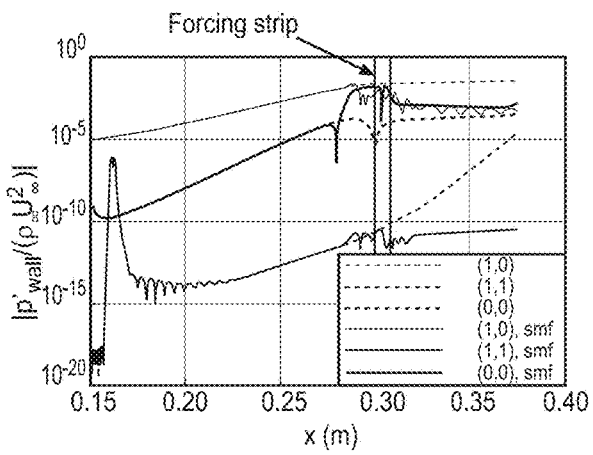
Figure 14D:
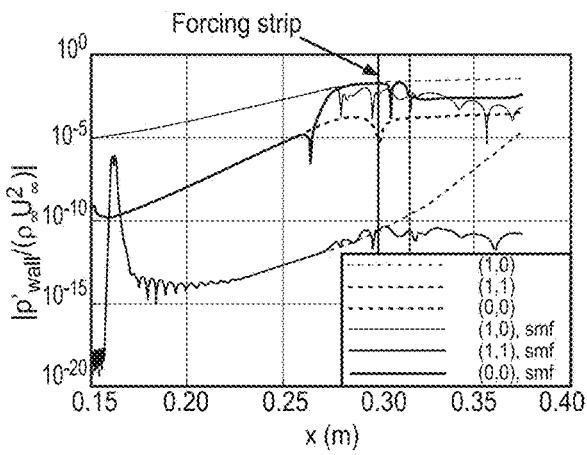

The amplitude development in the downstream direction of the primary and secondary disturbance wave as well as the steady disturbance mode are plotted for different wall blowing and suction strip locations in FIGS. 13A-13D. To isolate the effect of the strip position on the secondary instability the combined width of both forcing strips and the forcing amplitude were kept constant at $w=0.004$ m and $A_0=0.10$, respectively. For reference, the fundamental resonance without the blowing and suction strips is provided again in 13 FIGS. 13A-13D as dashed lines. The location of the strips was varied from $0.20 \text{ m} \leq x_s \leq 0.34$ m in increments of 0.02 m. When the forcing strips were moved upstream to $x_s=0.20$ m (FIG. 13A) the resonance onset is just slightly delayed in the downstream direction. The primary disturbance wave amplitude initially drops when the blowing and suction strips are applied, but a short distance downstream of the blowing and suction strips, the primary wave resumes to grow with a growth rate comparable to the uncontrolled case until it saturates at approximately the same saturation amplitude as before. The secondary disturbance wave shows a clearly delayed fundamental resonance onset but the growth rates after resonance onset appear to be unaffected when the forcing strips are applied at $x_s=0.20$ m. Moving the blowing and suction strips downstream to $x_s=0.26$ m (see FIG. 13B) shows a much more profound modification of the resonance onset process. The secondary disturbance wave has a clearly reduced spatial growth rate after the resonance onset. Towards the end of the computational domain, the primary wave seems to reach the saturation amplitude of the reference case again and the growth rate of the secondary disturbance wave is increased. The strip located at $x_s=0.30$ m (FIG. 13C) appears to be more effective in reducing the amplitude of the primary wave and the growth rate of the secondary wave. Downstream of the forcing strips, the primary wave saturates at a smaller amplitude and the secondary disturbance wave is completely stabilized. The results for the strip location at $x_s=0.34$ m (see FIG. 13D) also exhibit a significant reduction of the primary disturbance wave and a stabilization of the secondary disturbance wave. These results, however, suggest that a slot location at $x_s=0.30$ m is most effective to prevent a strong fundamental resonance onset because the amplitude of the secondary disturbance wave remains at much lower levels when the ICCA consisting of an upstream blowing strip and a downstream suction strip is applied at $x_s=0.30$ m (FIG. 13C) compared to $x_s=0.34$ m (FIG. 13D). Lower amplitude levels mean that the nonlinear generation of higher modes is suppressed, which in this case is desirable to delay the streak onset and the subsequent transition to turbulence as far downstream as possible in the downstream direction.

The effect of the combined width of the blowing and suctions strips (w) on the secondary instability is presented in FIGS. 14A-14D. The undisturbed fundamental resonance scenario is provided again as dashed lines. The results for the smallest combined width ($w=0.002$ m) of the forcing strips is plotted in FIG. 14A and shows that this ICCA width is not sufficient to modify the secondary instability mechanism since the case with flow control is indistinguishable from the uncontrolled reference case. An increasing combined width of the strips from $w=0.004$ m (FIG. 14B), $w=0.008$ m (FIG. 8C) and $w=0.016$ m (FIG. 14D) indicates that in either of these cases the secondary disturbance wave is completely stabilized and the resonance onset is substantially delayed, which inevitably will result in a transition delay since the secondary instability regime precedes the breakdown to turbulence. It is most practical to keep the combined width of the wall blowing and suction strips at a minimum. As a result, the ICCA parameters that will be used to investigate if the fundamental breakdown can be altered or controlled by an ICCA consisting of an upstream blowing and a downstream suction strip are $A_0=0.10$, $x_s=0.30$ m, and $w=0.004$ m ($w_b=w_s=0.002$ m).

The influence of blowing and suction strips on the fundamental breakdown is now described. To investigate the potential of the wall blowing and suction strips for flow control, to delay transition, the ICCA(s) was applied to the "controlled" fundamental breakdown case. The uncontrolled case will be considered as the reference case. Note that "controlled" breakdown refers to controlling the disturbance input to initiate the laminar-turbulent breakdown as opposed to natural breakdown due to environmental disturbances. Two different cases (case 1 and case 2) were carried out to test the efficacy of flow control using ICCAs consisting here of an upstream blowing and a downstream suction strip. For case 1, only one pair of forcing strips (upstream blowing, downstream suction) were used, whereas for case 2, the potential benefits of using two ICCAs was investigated.

Figure 15A:
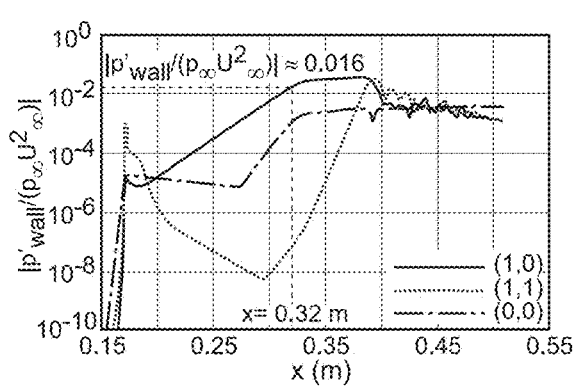
FIGS. 15A-15B are drawings illustrating development of the wall pressure disturbance amplitude in the downstream direction for the primary and the secondary disturbance wave and the base flow modulation for the fundamental breakdown case (FIG. 15A). Development of the spatial growth rate in the downstream direction of the primary disturbance wave obtained from the breakdown DNS and its linear behavior (FIG. 15B).
Figure 15B:
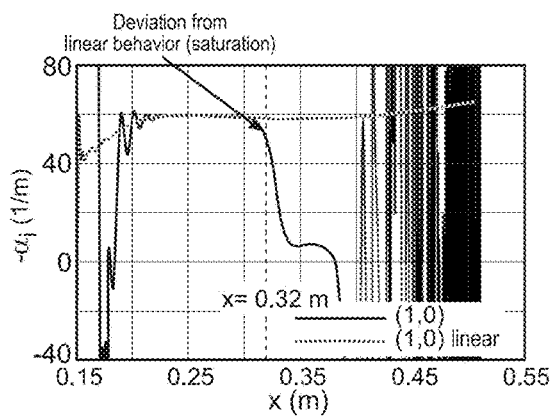

The forcing strip location(s), width(s) and the forcing amplitude(s) were selected based on the results of the influence of blowing and suction Strips on the secondary instability discussed above. The forcing amplitude for all blowing and suction strips used in cases 1 and 2 was $A_0=0.10$, which has been shown to be sufficient to alter the secondary instability behavior (FIGS. 12A-12D). The most effective location to alter the fundamental resonance onset and to stabilize the secondary disturbance wave was found to be close to the location where the primary wave begins to saturate (see FIGS. 13A-13D). The development of the amplitude of the primary and the secondary disturbance waves in the downstream direction as well as the steady mode (base flow modification) for the reference case are provided in FIG. 15A. The results show that the primary wave in the "controlled" breakdown scenario (reference) begins to saturate at approximately x=0.32 m. The comparison of the spatial growth rate development in the downstream direction of the primary wave for the fundamental breakdown and a calculation with a low forcing amplitude (linear behavior) of the primary wave in FIG. 15B shows a clear departure from the linear behavior at x=0.32 m, which confirms the nonlinear saturation onset. Therefore, the forcing strips (upstream blowing, downstream suction) for cases 1 and 2 were located at $x_s=0.32$ m. For case 2, an additional ICCA consisting of an upstream blowing strip and a downstream suction strip) was located downstream of the first ICCA at $x_s=0.40$ m. The combined width of all forcing strips utilized in cases. 1 and 2 was w=0.004 m, because the results in FIGS. 14A-14D showed that this width was sufficient to completely stabilize the secondary disturbance wave in a fundamental resonance onset. The parameters of the ICCAs for the two different cases are provided in Table 2.

TABLE 2

Forcing strip location and width and forcing parameters for the blowing and suction strips.

| Case Designation | Forcing strip position | Forcing strip width | Forcing amplitude |
|---|---|---|---|
| Case 1 | $x_{s, ICCA} = 0.32$ m | $w_{ICAA} = 0.004$ m | $A_0 = 0.1$ |
| Case 2 | $x_{s, ICCA\ 1} = 0.32$ m | $w_{ICCA\ 1} = 0.004$ m | $A_0 = 0.1$ |
|  | $x_{s, ICCA\ 2} = 0.32$ m | $w_{ICCA\ 2} = 0.004$ m | $A_0 = 0.1$ |

The "controlled" fundamental breakdown simulation was carried out by continuously forcing a primary and a secondary disturbance wave through a wall blowing and suction slot close to the inflow of the computational domain. After a quasi-steady (time-periodic) state was reached due to the periodic controlled disturbance input, and with the flow control turned off, the data were sampled with a sampling frequency of fsampling=1.5 MHz. When the flow control using the wall blowing and suction strip was turned on, the simulations for cases 1 and 2 (see Table 2) were restarted from the final output time step of the reference case, and continued until a new quasi-steady (time-periodic) state was reached.

Figure 16A:
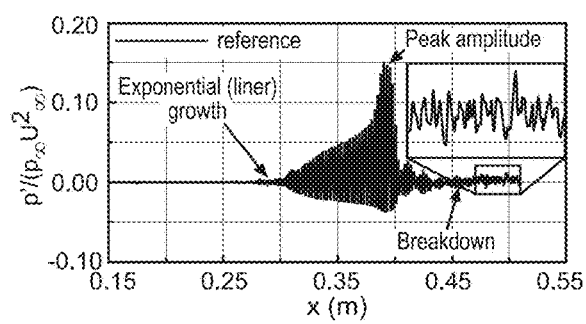
FIGS. 16A-16D are drawings illustrating instantaneous pressure disturbance at the wall extracted at the symmetry line after the transient has passed the computational domain for the fundamental breakdown reference case (FIG. 16A), the fundamental breakdown with one ICCA (case 1) (FIG. 16B), and the fundamental breakdown with ICCAs (case 2) (FIG. 16C).
Figure 16B:
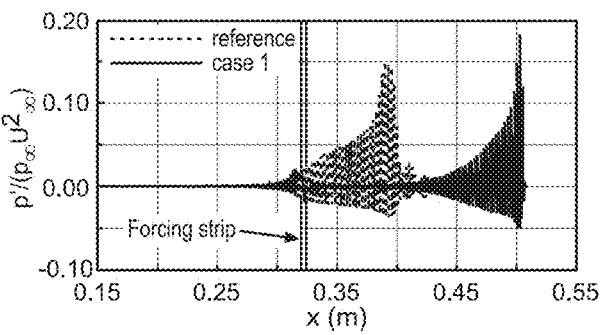
Figure 16C:
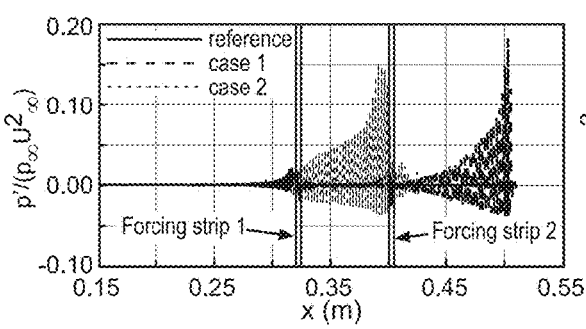
Figure 16D:
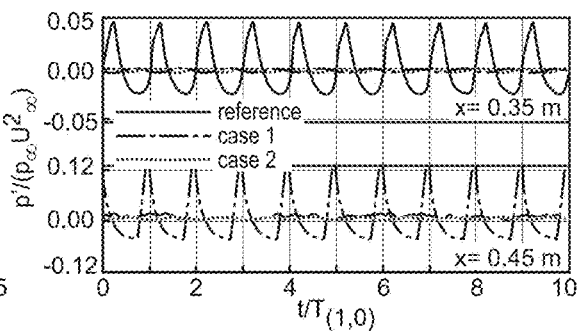

The instantaneous pressure disturbance signals at the wall extracted along the symmetry line (see FIG. 9) in the downstream direction for the reference case, case 1, and case 2 after the flow has adjusted to the ICCAs consisting of an upstream blowing and a downstream suction strip are shown in FIGS. 16A-16D. The pressure disturbance signal of the reference case in FIG. 16A exhibits exponential growth until large peak amplitudes are reached before the flow breaks down and the periodic character of the signal disappears to seemingly random fluctuations (close up in FIG. 16A). The instantaneous pressure disturbance signal in the downstream direction of case 1, after the flow has adjusted to the blowing and suction strips, is provided in FIG. 16B. The reference case signal is given for comparison and the forcing strip location is marked with a grey shaded area. The results in FIG. 16B show that the ICCA moves the location where the peak amplitude is reached significantly in the downstream direction and the breakdown and random fluctuations cannot be observed in the computational domain. A second ICCA also consisting of an upstream blowing and a downstream suction strip applied at $x_s=0.40$ m in case 2 prevents the rise of the pressure disturbance amplitude to the large peak amplitude values altogether within the computational domain as shown in FIG. 16C. This is a strong indication that the blowing and suction strips are not only an effective method to delay and control the secondary instability onset but also delay the nonlinear saturation and the subsequent nonlinear interactions leading to the "hot" streak formation and ultimately breakdown to turbulence. A direct comparison of the time signals at two different downstream locations of the reference case with the two cases where flow control is applied in FIG. 16D shows that the blowing and suction strips significantly delay the development of the large pressure disturbance amplitudes that precede the breakdown to turbulence or completely prevent it when multiple ICCAs are used. Avoiding these large pressure disturbance amplitudes has great potential for practical applications because these levels of pressure disturbance amplitudes can have negative effects on the structural integrity or guidance and control systems.

Figure 17A:
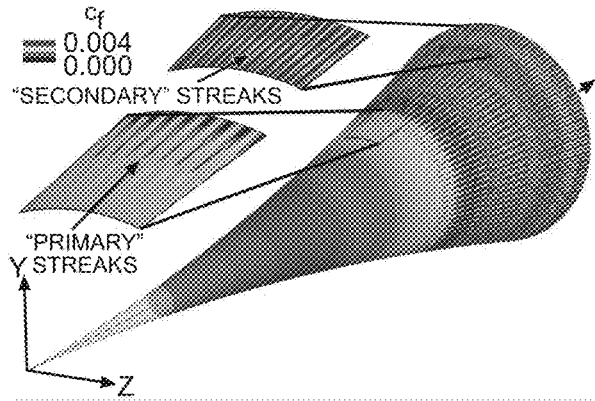
FIGS. 17A-17F are drawings illustrating time-averaged skin-friction coefficient and Stanton number contours on the surface of the cone for the reference case (FIGS. 17A-17B), case 1 (FIGS. 17C-17D), and case 2 (FIGS. 17E-17F).
Figure 17B:
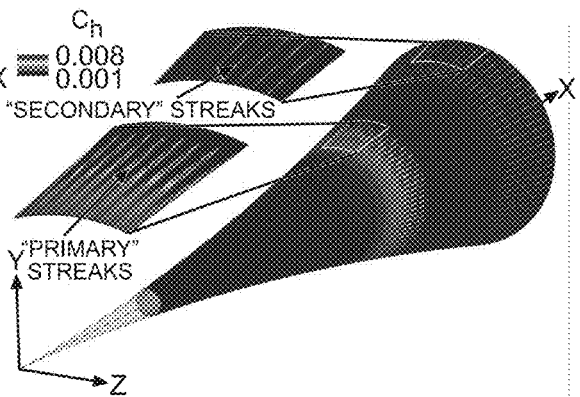
Figure 17C:
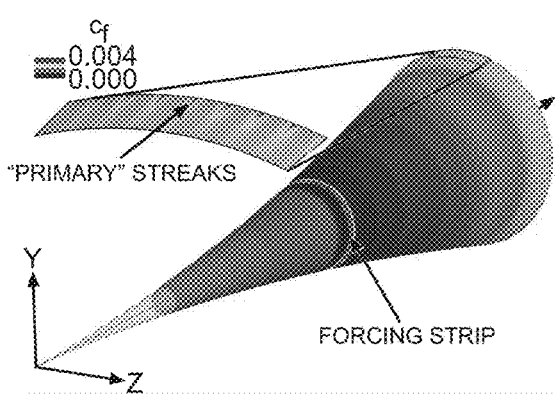
Figure 17D:
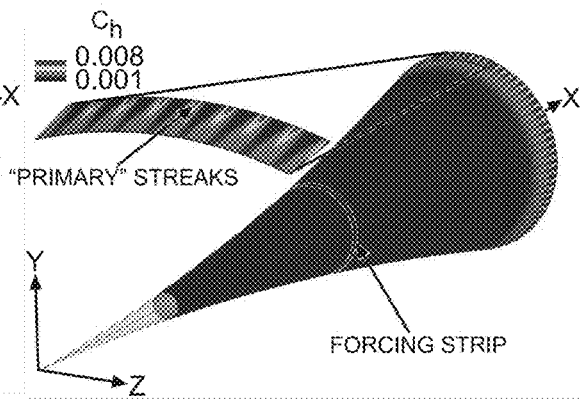
Figure 17E:
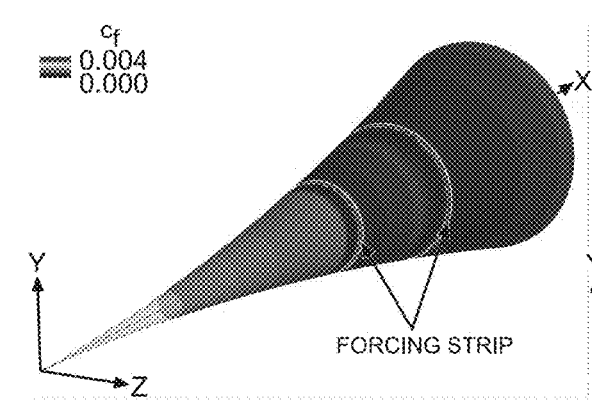
Figure 17F:
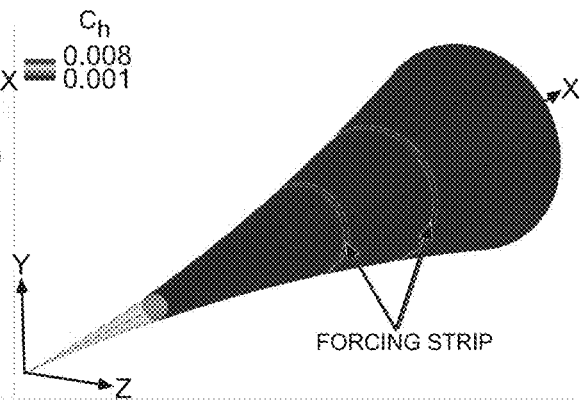

The time-averaged skin-friction coefficient and Stanton number contours on the surface of the cone are displayed in FIGS. 17A-17F. The skin-friction coefficient of the reference case (FIG. 17A) shows the development of "primary" and "secondary" streaks, which locally lead to large "overshoots" of the skin-friction, that far exceed the turbulent values. The results obtained for case 1 in FIG. 17C, where one ICCA consisting of an upstream blowing and a downstream suction strip is used, show that the steady forcing has a profound impact on the skin-friction distribution. The development of the "primary" streaks is significantly moved in the downstream direction. The streaks only begin to appear at the downstream end of the computational domain. The "secondary" streaks could not be observed at all in this case. Locally, a peak in the skin-friction distribution appears at the ICCA location. The "primary" streaks completely disappear when two ICCAs are used in case 2 as shown in FIG. 17E. For the second pair of blowing and suction strips, another local peak in the skin-friction contours can be observed. Comparing the time-averaged Stanton number on the surface of the cone of the reference case (FIG. 17B) to case 1 (FIG. 17D) and case 2 (FIG. 17F) reveals that the "primary" and "secondary" streaks are also moved downstream, similarly to the results observed for the skin-friction coefficient contours. The local peaks that were observed at the ICCA locations for the skin-friction coefficient contours are not present for the Stanton number contours.

Figure 18A:
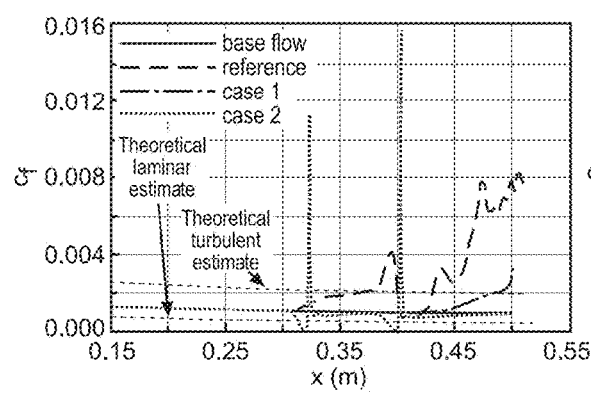
FIG. 18A is a plot illustrating time-averaged skin-friction coefficient.
Figure 18B:
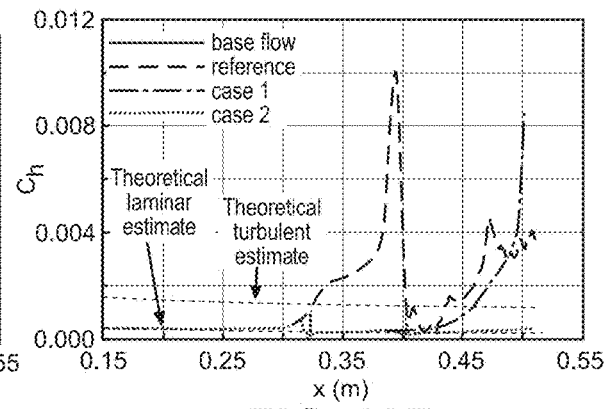
FIG. 18B is a plot illustrating Stanton number development in downstream direction for the base flow, the fundamental breakdown case (reference), case 1 and case 2 extracted at an azimuthal location cutting through a "primary" streak.

A direct comparison of the skin-friction coefficient development in the downstream direction extracted at an azimuthal location cutting through a "primary" streak for all three cases is presented in FIG. 18A. For reference, the skin-friction coefficient for the laminar, undisturbed base flow and the theoretical laminar and turbulent estimates are also provided in FIG. 18A. The ICCAs alter the development of the skin-friction coefficient in the downstream direction by substantially delaying the transition onset location, which is often defined as the location where the skin-friction coefficient departs from its laminar value. For case 1, the skin-friction begins to rise above the turbulent estimate towards the end of the computational domain whereas for case 2 the departure from the laminar base flow value (transition onset) cannot be observed in the computational domain. Two local spikes of the skin-friction coefficient can be observed at the locations of the blowing and suction strips ($x_s=0.32$ m and at $x_s=0.40$ m). Note that the spikes in the time-averaged skin-friction development on the surface of the cone are likely caused because the suction part of the control strip is directly connected to the blowing side for this investigation of the present disclosure. The time-averaged Stanton number development in the downstream direction of the reference case and the two different flow control cases together with the laminar base flow values and the theoretical laminar and turbulent estimates are plotted in FIG. 18B. The cases where the flow control using ICCAs consisting of an upstream blowing and downstream suction strips was employed show a significant delay of transition onset (case 1) or no transition onset at all (case 2). This is consistent with what was observed for the time averaged skin-friction development in the downstream direction. A notable difference is that the local spikes at the control strip are not present for the Stanton number.

Figure 19A:
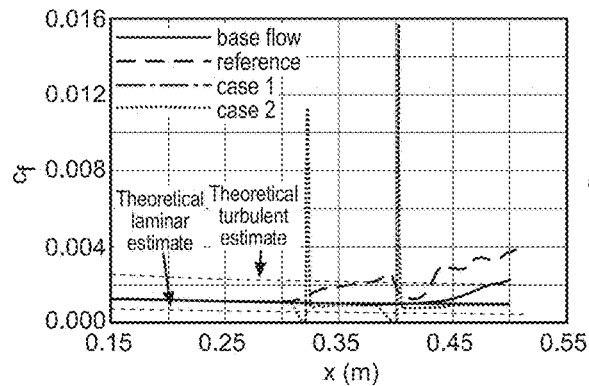
FIG. 19A is a plot illustrating time- and azimuthally-averaged skin-friction coefficient.
Figure 19B:
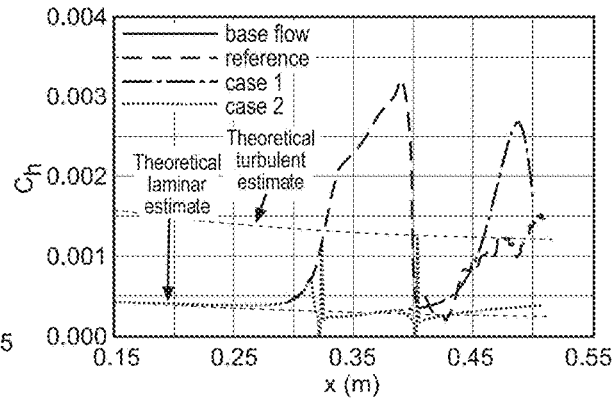
FIG. 19B is a plot illustrating Stanton number development in downstream direction for the base flow, the fundamental breakdown case (reference), case 1 and case 2.

The azimuthally- and time-averaged skin-friction coefficient and the Stanton number development in the downstream direction of the reference case, case 1, case 2, the base flow, and the theoretical laminar and turbulent estimates are provided in FIGS. 19A and 19B, respectively. The results confirm again that the blowing and suction strips substantially delay the overshoots of the skin-friction coefficient (FIG. 19A) and the Stanton number (FIG. 19B), that far exceed the turbulent value, and are associated with the "primary" and "secondary" streaks. This delay could result in a potential drag and heat transfer reduction. To obtain estimates for the viscous/friction drag force and heat transfer into the body the azimuthally- and time-averaged skin-friction coefficient (FIG. 19A) and Stanton number (FIG. 19B) were integrated over the surface of the cone and normalized with the wetted surface area, $A_{surface}$.

$$F_{f,norm} = \frac{1}{A_{surface}} \int_{surface} \tau_x dA$$

$$Q_{norm} = \frac{1}{A_{surface}} \int_{surface} q_w dA$$

where $F_{f,norm}$ is the normalized friction drag force and $Q_{norm}$ is the normalized heat transfer. The reduction of the friction drag and the heat transfer values for the cases employing flow control compared to the reference case were calculated as $$\epsilon_{F_{f,norm}} = \frac{|F_{f,norm,reference} - F_{f,norm}|}{F_{f,norm,reference}}$$

$$\epsilon_{Q_{norm}} = \frac{|Q_{norm,reference} - Q_{norm}|}{Q_{norm,reference}}$$

The integrated values of the three different cases and the drag and heat transfer reduction values are provided in Table 3. Flow control using ICCAs consisting of an upstream blowing and a downstream suction strips can result in substantial reductions of drag and heat transfer.

TABLE 3

Normalized viscous drag force and heat transfer estimates obtained from integrating the azimuthally- and time-averaged skin-friction coefficient and Stanton number over the surface of the cone and the respective changes of the integrated values for the flow control cases with respect to the reference.

| Case | $F_{f,norm}$ (N/m²) | $\epsilon_{F_{f,norm}}$ (%) | $Q_{norm}$ (W/m²) | $\epsilon_{Q_{norm}}$ (%) |
|---|---|---|---|---|
| Reference | 32.4 | — | 4947.5 | — |
| 1 | 18.1 | 44 | 3744.3 | 24 |
| 2 | 14.0 | 57 | 1356.0 | 73 |

Figure 20A:
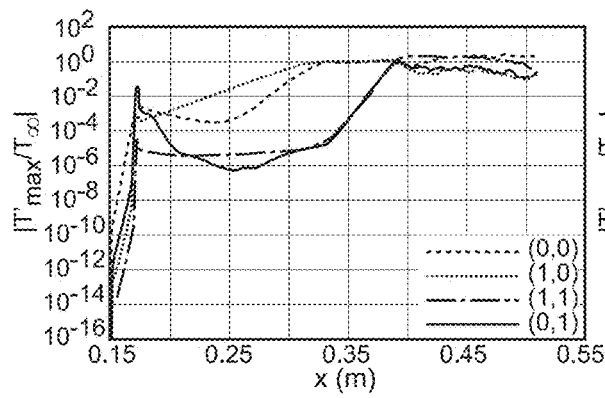
FIGS. 20A-20D are plots illustrating development of maximum temperature disturbance amplitude in downstream direction for a wide range of frequencies and azimuthal wave numbers for the reference case (FIG. 20A), case 1 (FIG. 20B), and case 2 (FIG. 20C).
Figure 20B:
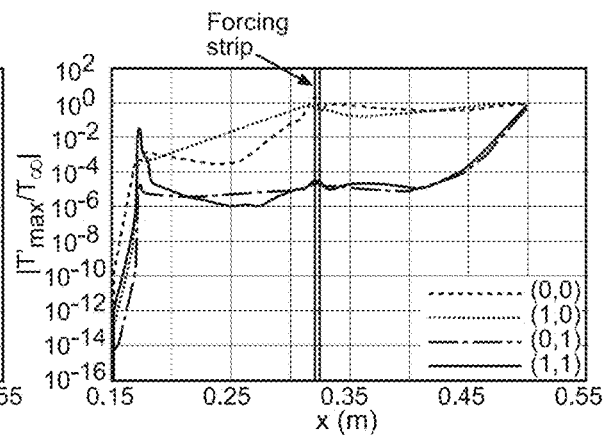
Figure 20C:
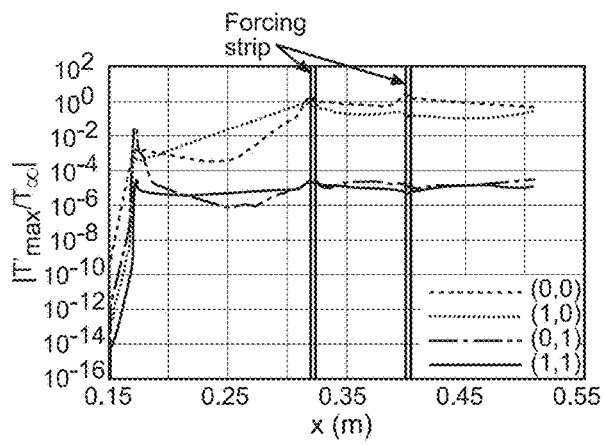
Figure 20D:
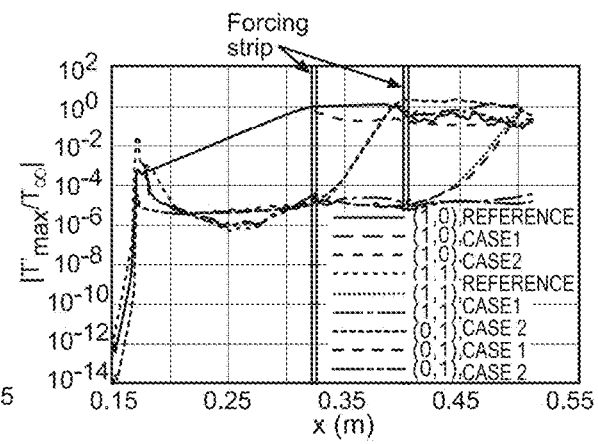

It has been shown that the development of the "primary" streaks was dominated by a nonlinearly generated, steady streamwise mode with the same azimuthal wave number as the secondary disturbance wave that was used to initiate the "controlled" fundamental breakdown. The downstream development of the amplitude of the maximum temperature disturbance is presented in FIG. 20A for a wide range of frequencies and wave numbers. FIG. 20A shows that mode (0,1) is nonlinearly generated as soon as the fundamental resonance between the primary and secondary disturbance wave sets in. This steady streamwise mode grows rapidly until it dominates the transition process. The amplitude development in the downstream direction for case 1 is plotted in FIG. 20B and shows that the blowing and suction strips located at $x_s=0.32$ m lead to a drop in the primary wave amplitude and prevent the secondary wave from experiencing strong secondary growth. As a result, the nonlinear generation of the streamwise steady mode is delayed (moved farther downstream). The primary wave continues to grow downstream of the ICCA until it reaches the saturation amplitude levels comparable to the amplitude upstream of the blowing and suction strips. Once the primary wave saturates again, strong fundamental resonance can be observed. In addition, the streamwise steady mode is generated and rapidly grows to large amplitude levels. In this case the computational domain is just long enough to see the onset of the "primary" streaks. The amplitude development in the downstream direction of case 2 (FIG. 20C) indicates that the resonance and, therefore, the streak development and the subsequent breakdown to turbulence can be delayed even farther downstream with an additional ICCA. These results suggest that transition on the flared cone can be prevented by applying multiple ICCAs consisting of an upstream blowing and a downstream suction strip along the surface of the body. A direct comparison of the development of the primary and the secondary disturbance waves and the steady streamwise mode of the reference case, case 1 and case 2 is presented in FIG. 20D. The primary wave development obtained from the three different cases shows that the first ICCA leads to a significant reduction of the primary wave amplitude and the second ICCA prevents the primary wave from growing again to reach amplitude levels (saturation) that are required to trigger the strong nonlinear interactions preceding the breakdown to turbulence. The fundamental resonance onset of the secondary disturbance wave for case 1 is significantly delayed, and case 2 exhibits no resonance at all. As a result, the nonlinear generation of mode (0,1) is delayed for case 1 and completely prevented for case 2 in the computational domain considered here. These results provide strong evidence that the nonlinear mechanisms can be controlled using the flow control devices described above.

Figure 21A:
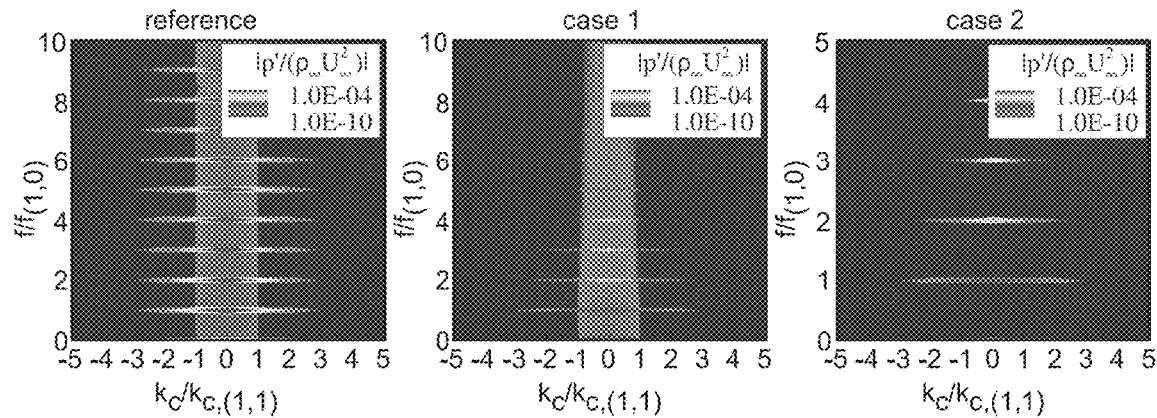
FIGS. 21A-21B are drawings illustrating amplitude spectra in normalized azimuthal wave number and frequency space for the reference case (left), case 1 (middle) and case 2 (right) extracted at x=0.35 m (FIG. 21A), and x=0.50 m (FIG. 21B).
Figure 21B:
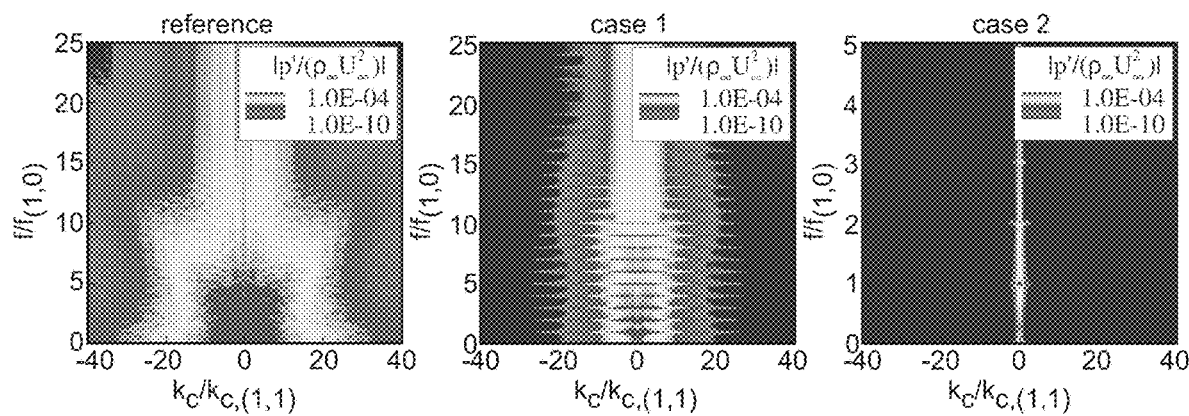

The amplitude spectra in the plane of the normalized azimuthal wave number and frequency for the three different cases are provided at two different downstream locations in FIGS. 21A and 21B. The spectra in FIG. 21A were extracted at x=0.35 m, just downstream of the first ICCA, and clearly show that the blowing and suction strips prevent the nonlinear generation of higher harmonics of the primary disturbance wave frequency (f=300 kHz). The reference case (FIG. 21A, left) exhibits dominance of the primary disturbance wave and its higher harmonics indicating that the flow is still strongly periodic but nonlinearly generated disturbance modes are relevant at this location. These higher harmonics are observable for cases 1 (FIG. 21A, middle) and 2 (FIG. 21A, right) as well but much less pronounced compared to the reference case, indicating strongly modified nonlinear generation of higher modes. The spectra extracted downstream of the second pair of blowing and suction strips at x=0.50 m are presented in FIG. 21B and show how much the breakdown is delayed by the ICCAs. The reference case (FIG. 21B, left) shows a wide spectrum of azimuthal wave numbers and frequencies indicating that the flow has progressed deep into the nonlinear breakdown regime. The spectrum of case 1 (FIG. 21B, middle) indicates that the flow is still heavily dominated by the primary disturbance wave frequency and its higher harmonics. Although the spectrum exhibits a broadening in the azimuthal wave number space the flow has not progressed as far into the nonlinear breakdown regime as the reference case. For case 2 (FIG. 21B, right) the spectrum still shows a strongly dominant primary wave and only a couple of weaker higher harmonics. No indication of broadening in the azimuthal wave number can be detected indicating that the flow is still laminar.

Figure 22:
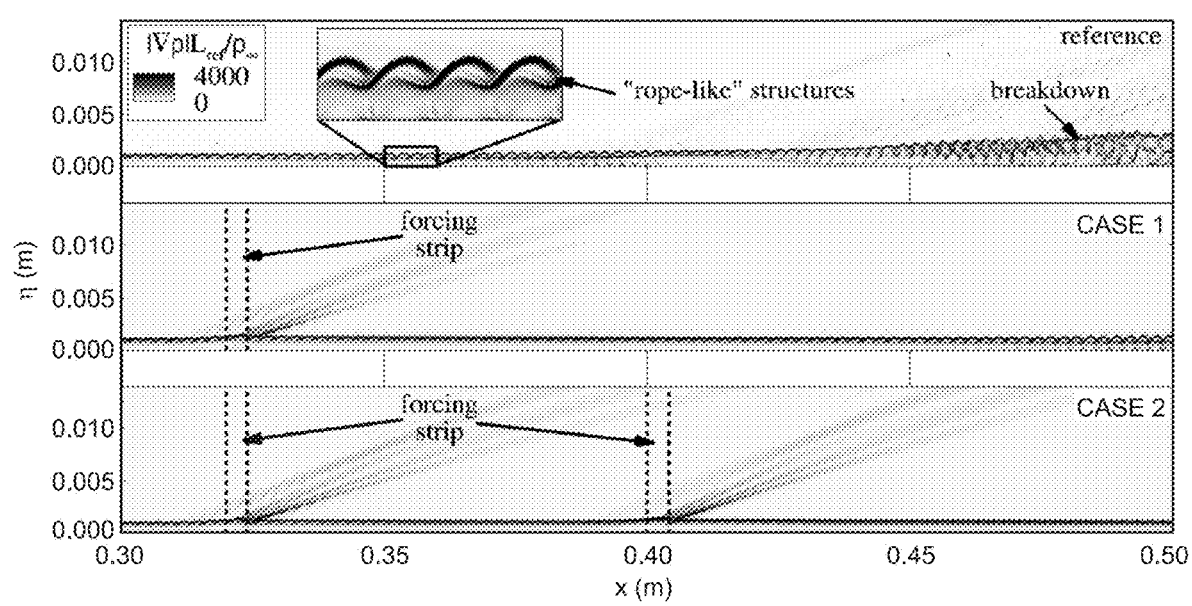
FIG. 22 illustrates drawings of contours of the magnitude of the density gradient ("pseudo-schlieren") in the symmetry plane for 0.3 m≤x≤0.5 m for the reference case (top), case 1 (middle), and case 2 (bottom).
Figure 23:
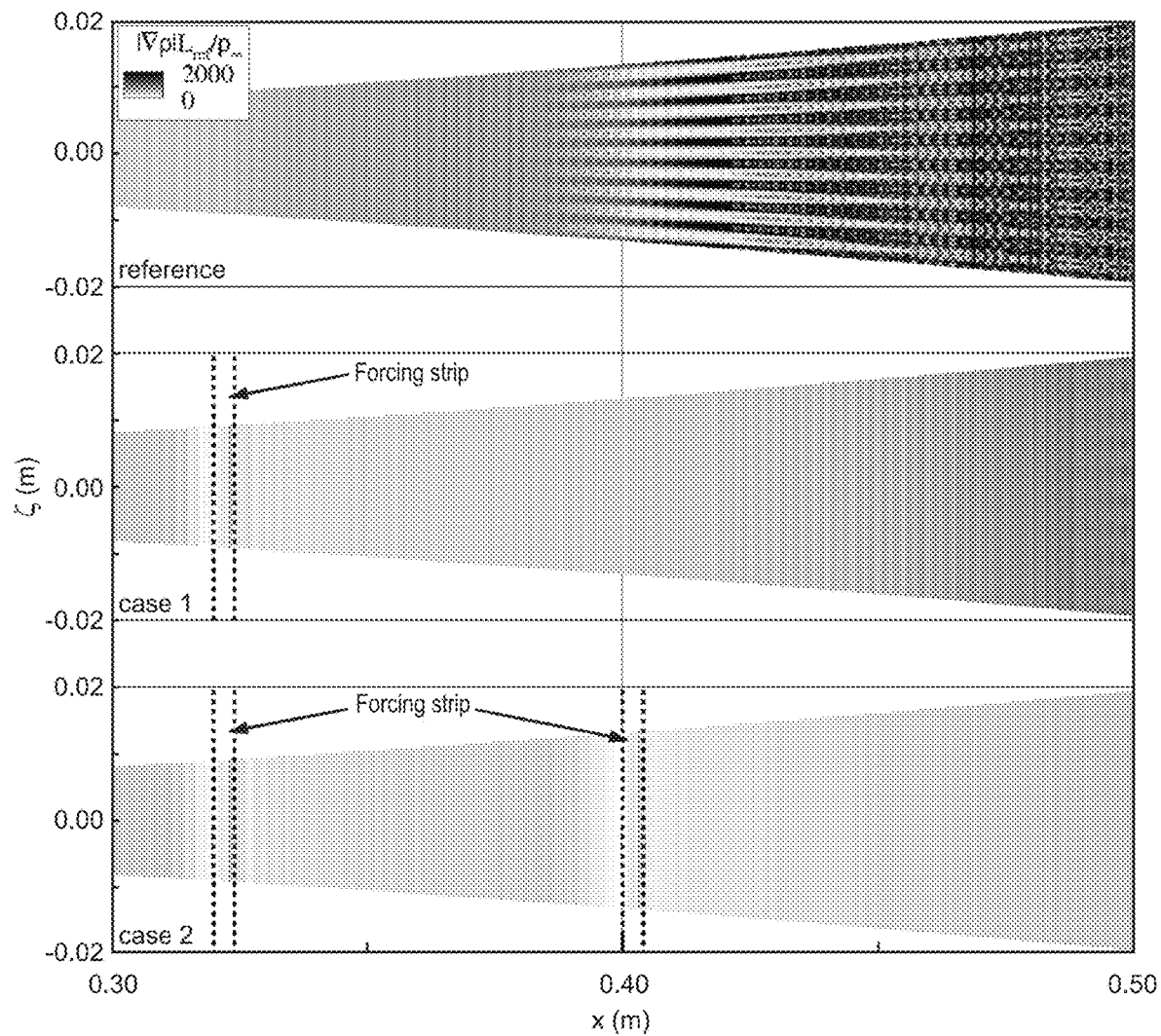
FIG. 23 illustrates drawings of contours of the magnitude of the density gradient in the unrolled cone surface in the x-ζ plane.

The flow structures are visualized using the so-called pseudo-schlieren (density gradient magnitude). The pseudo-schlieren allow for a qualitative comparison of experimental schlieren imaging if available. The pseudo-schlieren contours in the wall normal plane along the symmetry line of the cone for the reference case and the two flow control cases are displayed in FIG. 22. For the reference case (FIG. 22, top) the formation of "rope-like" structures can be observed before smaller scales are generated indicating that the flow in the reference case has progressed deep into the nonlinear breakdown regime. For case 1 (FIG. 22, middle) the "rope-like" structures are developing until the ICCA location. A weak shock is emanating from the blowing and suction strips and the "rope-like" character disappears but develops again towards the end of the computational domain. For case 2 (FIG. 22, bottom) another weak shock is formed at the location of the other pair of blowing and suction strips. This confirms the previous observations that flow control using ICCAs has the potential to substantially prevent the most dominant nonlinear mechanisms that would ultimately lead to transition. To analyze the flow structures in the azimuthal direction the pseudo-schlieren for the reference case are compared to the flow control cases for the unrolled surface G, see above) approximately half a boundary layer thickness above the cone surface in FIG. 23. The locations of the blowing and suctions strips (ICCAs) are marked with dashed lines. The pseudo-schlieren contours for the reference case (FIG. 23, top) show a predominantly axisymmetric character up to x≈0.38 m when suddenly the flow begins to exhibit dominant three-dimensional ("wedge-like") structures, marking the transition onset. The contours for case 1 (FIG. 23, middle) show that the dominant axisymmetric structures are weakened downstream of the blowing and suction strips. This is consistent with the observed amplitude drop of the primary disturbance wave shown in FIG. 20. In addition, the pseudo-schlieren contours of case 1 in FIG. 23 (middle) show that the development of the three-dimensional structures is suppressed until the end of the computational domain where a modulation of the dominant structures in the azimuthal direction can be observed. Using an additional ICCA downstream of the first ICCA in case 2 (FIG. 23, bottom) shows again that the development of three-dimensional structures is prevented altogether in this case. The dominant axisymmetric structures are reduced in amplitude. The blowing and suction strips prevent nonlinear interactions and the development of three-dimensional modes, that are crucial for the breakdown to turbulence. As a result, ICCAs consisting of upstream blowing and downstream suction strips successfully delay transition and prevent the detrimental effects associated with it (very large disturbance amplitudes, "hot" streaks, . . . ).

Figure 24A:
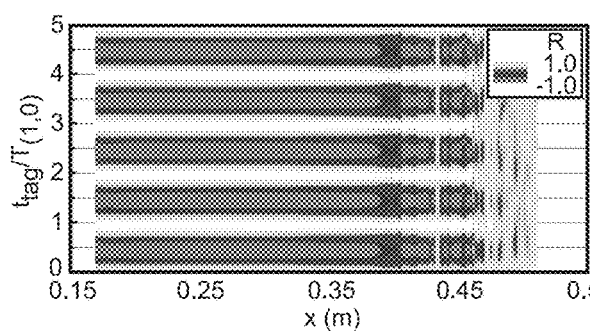
FIGS. 24A-24D illustrate drawings of contours of the auto-correlation factor calculated along the downstream direction along the symmetry line on the surface of the cone (φ=0) for the reference case (FIG. 24A), case 1 (FIG. 24B), and case 2 (FIG. 24C).
Figure 24B:
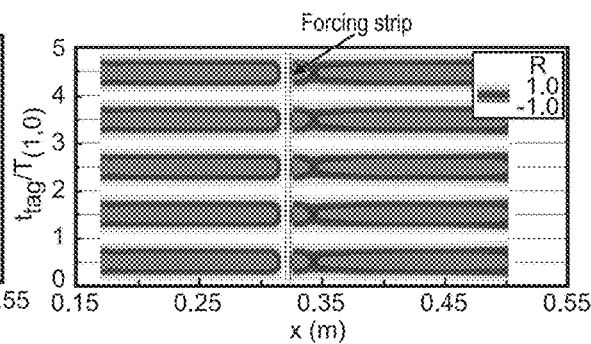
Figure 24C:
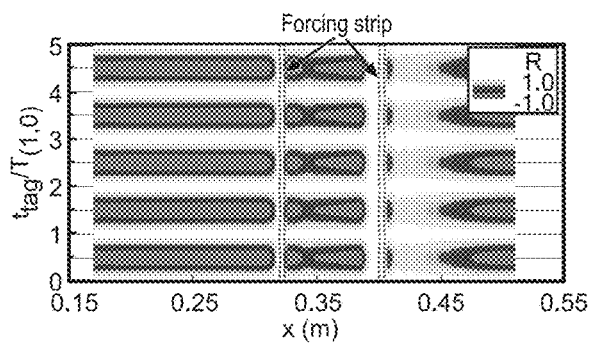
Figure 24D:
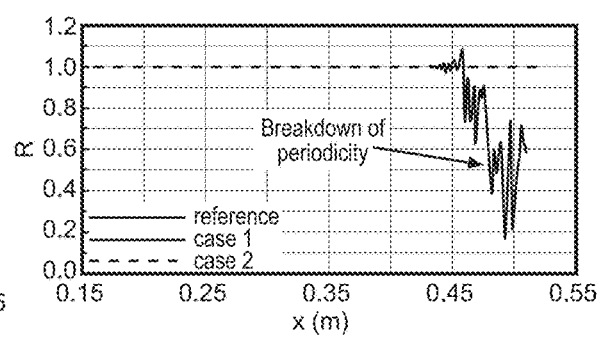

In the turbulent regime, the flow breaks down to random fluctuations. How far the flow has progressed towards turbulence can be quantified by an auto-correlation factor R. Here, the time lag used to calculate the auto-correlation factor is normalized with the primary wave period $T_{(1,0)}$. The contours of the auto-correlation factor of the reference case in FIG. 24A exhibit a strong periodicity dominated by the primary wave period until x≈0.45 m when the auto-correlation factor quickly drops, and the periodicity disappears. This indicates that the flow has reached the late nonlinear stages of the laminar-turbulent breakdown process. Considering that the auto-correlation factor does not vanish (R=0) these results suggest that while the periodicity of the flow drops substantially, the flow in the reference case is not fully turbulent yet. The auto-correlation contours of case 1 (FIG. 24B) and case 2 (FIG. 24C) show that the forcing strips completely prevent the drop in periodicity. In both cases, the primary disturbance wave is the most dominant mode. Downstream of the second ICCA (x≈0.41 m) in case 2 (FIG. 24C), it appears as if the flow is perfectly axisymmetric (steady) indicated by an auto-correlation factor that is nearly constant along the time lag axis. A comparison of the auto-correlation factor development in downstream direction for a constant time lag of one primary wave period ($t_{lag}/T_{(1,0)}$=1) between the three cases is presented in FIG. 24D. The results show that for the reference case the periodicity of the flow begins to drop rapidly around x=0.45 m while the cases where active flow control is used are almost perfectly periodic (R=1). This is further proof that the ICCAs consisting of an upstream blowing and a downstream suction strip prevent the nonlinear breakdown to turbulence.

The goal of this investigation of the present disclosure was to assess the feasibility of employing blowing and suction strips (ICCAs) for flow control, in a high-speed boundary layer (M=6) on a flared cone, to delay transition. The blowing and suction strips were applied to a laminar base flow first and the resulting streamline pattern showed that the ICCAs lead to a visible displacement of the flow.

A thorough investigation of the influence of the wall blowing and suction strips on the secondary instability, in particular fundamental resonance, revealed the most effective location and size of the blowing and suction strips location to prevent resonance onset. It was shown that the forcing amplitude has to be sufficiently large to observe an effect on the secondary instability. The most effective location of the blowing and suction strips, to alter the fundamental resonance behavior and delay secondary growth, was found to be close to the location where the primary wave nonlinearly saturates. To be an effective flow control method, the combined width (w) of the blowing and suction strips had to exceed a certain value of approximately four boundary layer thicknesses. A further increase showed no additional benefits.

The application of the ICCAs to a fundamental breakdown using high-resolved DNS showed the great potential of this flow control method to delay transition onset and with it the associated development of "hot" streaks on the surface of the cone that result in massive "overshoots" of the skin-friction coefficient and the Stanton number, far exceeding the turbulent values. With one ICCA, the transition onset was delayed all the way to the end of the computational domain while with two ICCAs the transition onset was delayed even further, such that it could not be observed in the computational domain anymore. Detailed analysis of the DNS data showed that the control strips prevent nonlinear interactions and therefore, the nonlinear generation of three-dimensional disturbance modes that are vital for the breakdown to turbulence. Estimates of averaged skin-friction drag and heat transfer showed substantial reductions for the cases using flow control compared to the reference case without ICCAs.

Exemplary Methods and Systems

Embodiments are directed to a method of controlling boundary-layer transition for a high-speed vehicle. The method includes determining a location of onset of boundary-layer transition that naturally develops during high-speed flight of the high-speed vehicle. The method also includes providing a pair of flow control strips at a surface/wall/skin of the high-speed vehicle such that the boundary-layer transition is delayed or prevented during high-speed flight of the high-speed vehicle. The delayed or prevented locations of the transition result in a change in the high-speed boundary layer during the high-speed flight of the high-speed vehicle. The change in the high-speed boundary layer transition affects skin friction drag, aero-thermodynamic heating, and pressure fluctuations in the boundary layer of the high-speed vehicle.

In an embodiment, the flow control strips comprise an upstream strip and a downstream strip, and wherein the upstream strip is immediately adjacent the downstream strip.

In an embodiment, the upstream strip and the downstream strip comprise devices selected from the group consisting of blowing devices, sucking devices, heating devices, cooling devices, high thermal conductivity devices, low thermal conductivity devices, and combinations thereof.

In an embodiment, the upstream strip is a blowing device and the downstream strip is a sucking device.

In an embodiment, the upstream strip is a heating device and the downstream strip is a cooling device.

In an embodiment, the upstream strip is a high thermal conductivity device and the downstream strip is a low thermal conductivity device.

In an embodiment, the surface/wall/skin is located on the high-speed vehicle, and the upstream strip and the downstream strip are provided spanwise, approximately perpendicular to a free-stream flow direction, on the high-speed vehicle.

In an embodiment, the method further comprises providing, at a distance from the pair of flow control strips, another pair of flow control strips at the surface/wall/skin of the high-speed vehicle.

Embodiments are also directed to a system that controls boundary layer transition for a high-speed vehicle. The system includes a surface/wall/skin of the hypersonic vehicle that is associated with a location of onset of boundary-layer transition that naturally develops during high-speed flight of the high-speed vehicle. The system also includes a pair of flow control strips provided at the surface/wall/skin of the high-speed vehicle such that the boundary-layer transition is delayed or prevented during high-speed flight of the high-speed vehicle. The delayed or prevented locations of the transition result in a change in the high-speed boundary layer during the high-speed flight of the high-speed vehicle. The change in the high-speed boundary layer transition affects skin friction drag, aero-thermodynamic heating, and pressure fluctuations in the boundary layer of the high-speed vehicle.

In an embodiment of the system, the flow control strips comprise an upstream strip and a downstream strip, and wherein the upstream strip is immediately adjacent the downstream strip.

In an embodiment of the system, the upstream strip and the downstream strip comprise devices selected from the group consisting of blowing devices, sucking devices, heating devices, cooling devices, high thermal conductivity devices, low thermal conductivity devices, and combinations thereof.

In an embodiment of the system, the upstream strip is a blowing device and the downstream strip is a sucking device.

In an embodiment of the system, the upstream strip is a heating device and the downstream strip is a cooling device.

In an embodiment of the system, the upstream strip is a high thermal conductivity device and the downstream strip is a low thermal conductivity device.

In an embodiment of the system, the surface/wall/skin is located on the high-speed vehicle, and the upstream strip and the downstream strip are provided spanwise, approximately perpendicular to a free-stream flow direction, on the high-speed vehicle.

In an embodiment of the system, the system further comprises, at a distance from the pair of flow control strips, another pair of flow control strips provided at the surface/wall/skin of the high-speed vehicle.

The strategies discussed above (and illustrated in the figures) for control of transition can be also "on demand", i.e., they are only "active" when needed during the flight trajectory. The active periods can be predetermined based on look-up tables when the flight trajectory is defined a priori. Otherwise, it can be done entirely automatically using various sensors (thermocouples, shear, stress, pressure, etc.) that determines the state of the boundary layer (i.e., laminar, transitional or turbulent) downstream of the "actuator" (flow control strip) locations. A simple and robust feedback controller will then engage (employ) the actuators depending on the type of control required or desired (delay or acceleration of transition).

Using the "on-demand" strategy, either by look-up tables or feedback control, has the advantage (over a strategy where the control is always "on") that the aerodynamic drag (and heating) caused by the flow control strips ("actuators") is eliminated in the parts of the flight trajectory when transition control is not needed. The on-demand strategy also increases the durability of the actuators in the harsh hypersonic flight conditions. All of the actuator techniques above can be accommodated for the "on demand" control. For example, the blowing or sucking by the blowing and sucking devices would be disabled when not engaged for control.

Although embodiments are described above with reference to the use of flow control techniques for hypersonic vehicles, the flow control techniques described in any of the above embodiments may alternatively be employed with high-speed vehicles (above Mach 1.0). Such alternatives are considered to be within the spirit and scope of the present invention, and may therefore utilize the advantages of the configurations and embodiments described above.

The method steps in any of the embodiments described herein are not restricted to being performed in any particular order. Also, structures or systems mentioned in any of the method embodiments may utilize structures or systems mentioned in any of the device/system embodiments. Such structures or systems may be described in detail with respect to the device/system embodiments only but are applicable to any of the method embodiments.

Features in any of the embodiments described in this disclosure may be employed in combination with features in other embodiments described herein, such combinations are considered to be within the spirit and scope of the present invention.

The contemplated modifications and variations specifically mentioned in this disclosure are considered to be within the spirit and scope of the present invention.

More generally, even though the present disclosure and exemplary embodiments are described above with reference to the examples according to the accompanying drawings, it is to be understood that they are not restricted thereto. Rather, it is apparent to those skilled in the art that the disclosed embodiments can be modified in many ways without departing from the scope of the disclosure herein. Moreover, the terms and descriptions used herein are set forth by way of illustration only and are not meant as limitations. Those skilled in the art will recognize that many variations are possible within the spirit and scope of the disclosure as defined in the following claims, and their equivalents, in which all terms are to be understood in their broadest possible sense unless otherwise indicated.

What is claimed is:

1. A method of controlling boundary-layer transition for a hypersonic vehicle, the method comprising:
   determining a location of onset of boundary-layer transition that naturally develops during hypersonic flight of the hypersonic vehicle; and
   providing a pair of flow control strips imbedded in a surface or wall or skin of the hypersonic vehicle such that the boundary-layer transition is delayed or prevented during hypersonic flight of the hypersonic vehicle, the pair of flow control strips comprising an upstream strip and a downstream strip, and the upstream strip and the downstream strip are immediately adjacent and share a common divider,
   wherein the delayed or prevented locations of the transition result in a change in the hypersonic boundary layer during the hypersonic flight of the hypersonic vehicle, and
   wherein the change in the hypersonic boundary layer transition affects skin friction drag, aero-thermodynamic heating, and pressure fluctuations in the boundary layer of the hypersonic vehicle.

2. The method of claim 1, wherein the upstream strip and the downstream strip comprise devices selected from the group consisting of blowing devices, sucking devices, heating devices, cooling devices, high thermal conductivity devices, low thermal conductivity devices, and combinations thereof.

3. The method of claim 1, wherein the upstream strip is a blowing device and the downstream strip is a sucking device.

4. The method of claim 1, wherein the upstream strip is a heating device and the downstream strip is a cooling device.

5. The method of claim 1, wherein the upstream strip is a high thermal conductivity device and the downstream strip is a low thermal conductivity device.

6. The method of claim 1, wherein the surface or wall or skin is located on the hypersonic vehicle, and the upstream strip and the downstream strip are provided spanwise, approximately perpendicular to a free-stream flow direction, on the hypersonic vehicle.

7. The method of claim 1, wherein the method further comprises providing, at a distance from the pair of flow control strips, another pair of flow control strips at the surface or wall or skin of the hypersonic vehicle.

8. The method of claim 1, wherein the upstream and downstream strips are different from one another.

9. A system that controls boundary-layer transition for a hypersonic vehicle, the system comprising:
   a surface or wall or skin of the hypersonic vehicle that is associated with a location of onset of boundary-layer transition that naturally develops during hypersonic flight of the hypersonic vehicle; and
   a pair of flow control strips imbedded in the surface or wall or skin of the hypersonic vehicle such that the boundary-layer transition is delayed or prevented during hypersonic flight of the hypersonic vehicle, the pair of flow control strips comprising an upstream strip and a downstream strip, and the upstream strip and the downstream strip are immediately adjacent and share a common divider and,
   wherein the delayed or prevented locations of the transition result in a change in the hypersonic boundary layer during the hypersonic flight of the hypersonic vehicle, and
   wherein the change in the hypersonic boundary layer affects skin friction drag, aero-thermodynamic heating, and pressure fluctuations in the hypersonic boundary layer of the hypersonic vehicle.

10. The system of claim 9, wherein the upstream strip and the downstream strip comprise devices selected from the group consisting of blowing devices, sucking devices, heating devices, cooling devices, high thermal conductivity devices, low thermal conductivity devices, and combinations thereof.

11. The system of claim 9, wherein the upstream strip is a blowing device and the downstream strip is a sucking device.

12. The system of claim 9, wherein the upstream strip is a heating device and the downstream strip is a cooling device.

13. The system of claim 9, wherein the upstream strip is a high thermal conductivity device and the downstream strip is a low thermal conductivity device.

14. The system of claim 9, wherein the surface or wall or skin is located on the hypersonic vehicle, and the upstream strip and the downstream strip are provided spanwise, approximately perpendicular to a free-stream flow direction, on the hypersonic vehicle.

15. The system of claim 9, wherein the system further comprises, at a distance from the pair of flow control strips, another pair of flow control strips provided at the surface or wall or skin of the hypersonic vehicle.

16. The system of claim 9, wherein the upstream and downstream strips are different from one another.

* * * * *